US012538899B1

(12) United States Patent
Sadler et al.

(10) Patent No.: US 12,538,899 B1
(45) Date of Patent: *Feb. 3, 2026

(54) PET SAFETY RESTRAINT DEVICE FOR VEHICLES

(71) Applicants: Clinton A. Sadler, Blue, AZ (US); Nicholas Ippolito, Blue, AZ (US)

(72) Inventors: Clinton A. Sadler, Blue, AZ (US); Nicholas Ippolito, Blue, AZ (US)

(*) Notice: Subject to any disclaimer, the term of this patent is extended or adjusted under 35 U.S.C. 154(b) by 142 days.

This patent is subject to a terminal disclaimer.

(21) Appl. No.: 18/513,558

(22) Filed: Nov. 19, 2023

Related U.S. Application Data

(63) Continuation-in-part of application No. 17/994,690, filed on Nov. 28, 2022, now Pat. No. 11,833,994.

(60) Provisional application No. 63/283,601, filed on Nov. 29, 2021.

(51) Int. Cl.
- *B60R 22/34* (2006.01)
- *A01K 27/00* (2006.01)
- *B60R 22/10* (2006.01)

(52) U.S. Cl.
CPC ............ *A01K 27/00* (2013.01); *A01K 27/004* (2013.01); *B60R 22/10* (2013.01)

(58) Field of Classification Search
CPC ........ B60R 22/10; B60R 22/34; A01K 27/00; A01K 27/004
See application file for complete search history.

(56) References Cited

U.S. PATENT DOCUMENTS

| | | | |
|---|---|---|---|
| 3,604,655 A | 9/1971 | Jones | |
| 4,069,987 A | 1/1978 | Fisher | |
| 4,526,328 A | 7/1985 | Kilpatrick | |
| 4,801,105 A | 1/1989 | Frisk | |
| 6,834,621 B1 | 12/2004 | O'Neill | |
| 6,860,566 B2 | 3/2005 | Ruff | |
| 7,628,349 B2 | 12/2009 | Clute et al. | |
| 8,251,304 B2 | 8/2012 | Boyer et al. | |
| 8,516,979 B2 | 8/2013 | Ek | |
| 8,550,036 B2 | 10/2013 | Morris et al. | |
| 8,622,431 B2 | 1/2014 | Singh | |

(Continued)

FOREIGN PATENT DOCUMENTS

GB 2421008 A 6/2006

OTHER PUBLICATIONS

"Mighty Paw Dog Vehicle Safety Belt," Chewy.com. https://www.chewy.com/mighty-paw-dog-vehicle-safety-belt/dp/137323 [Jul. 9, 2021].

(Continued)

*Primary Examiner* — Sang K Kim
(74) *Attorney, Agent, or Firm* — Bold IP, PLLC; Christopher Mayle

(57) ABSTRACT

A pet safety restraint device is provided that restrains pets transported in a vehicle. The pet safety device has a retractable leash built into or attached to it. The retractable leash is attachable to a pet harness that can be worn by the pet. The pet safety device provides the pet with a limited range of movement within the vehicle. When an inertial force is exerted on the vehicle and the passengers and the pet in the vehicle, the pet safety restraint device includes a ball housed within the pet safety restraint device that lodges within a gap between teeth of a rotating gear piece in the pet safety restraint device. The retractable leash is locked in place, thus pulling back on the pet and preventing the pet from crashing in the vehicle or being thrown out of the vehicle.

20 Claims, 30 Drawing Sheets

(56) References Cited

U.S. PATENT DOCUMENTS

| | | |
|---|---|---|
| 9,010,279 B1 | 4/2015 | Saber |
| 9,295,578 B2 | 3/2016 | Grassi Osma et al. |
| 9,392,770 B2 | 7/2016 | Almeida |
| 9,592,791 B2 | 3/2017 | Yoon |
| 9,637,085 B2 | 5/2017 | Sanchez et al. |
| 9,981,629 B2 | 5/2018 | Farrugia |
| 10,117,420 B2 | 11/2018 | Manssourian |
| 2005/0000470 A1 | 1/2005 | Fountoulakis |
| 2014/0305384 A1 | 10/2014 | Ramirez |
| 2016/0227732 A1 | 8/2016 | Pompey |

OTHER PUBLICATIONS

"SlowTon Adjustable Dog Car Seat Belt, 2 count," Chewy.com. https://www.chewy.com/slowton-adjustable-dog-car-seat-belt/dp/264107 [Jul. 9, 2021].

"Dogit Car Safety Dog Belt," Chewy.com. https://www.chewy.com/dogit-car-safety-dog-belt/dp/50603 [Jul. 9, 2021].

PET SAFETY RESTRAINT DEVICE FOR VEHICLES

CROSS-REFERENCE TO RELATED APPLICATIONS

This application is a continuation in part application which claims priority to non-provisional application Ser. No. 17/994,690 and was filed on Nov. 28, 2022, which claims priority to U.S. Provisional Patent Application No. 63/283,601 filed on Nov. 29, 2021, all of which are incorporated by reference in their entirety.

FIELD OF THE DESCRIPTION

The present invention relates to a pet safety restraint device for protecting a pet in a vehicle from sudden changes in movement of the vehicle, such as during accidents or crashes, in order to prevent the pet from being injured during such accidents or crashes.

BACKGROUND

It is commonplace for pet owners to allow their pets to roam freely within a vehicle in a back seat or a front seat of the vehicle. Unfortunately, most often the pets are not restrained by any type of safety seat belt or the like to protect the pets in case there is an accident. Accordingly, there are many instances in which pets are gravely injured or killed in a vehicle without a proper safety device to restrain their movement and keep them from slamming against the vehicle and/or through the windows. Further, a disadvantage of existing devices is that they are overly restrictive contraptions that make for an unhappy pet depending on the dog's disposition and/or length of the trip. If a device is difficult to use or any combination of the scenarios just described, then it is more likely that no safety device will be used at all to protect the pet.

Accordingly, there is a need for a pet safety restraint device that may be used to protect a pet when in a vehicle as described in one or more non-limiting embodiments described below in the present description.

SUMMARY

In a non-limiting embodiment, the present description comprises a pet safety restraint device comprising a cover housing having an interior cavity, a rotatable gear piece having one or more teeth with spaces between each tooth, a coil spring housing coupled to a topside of the rotatable gear piece, wherein the coil spring housing comprises a coil spring cavity and a slot extending into the coil spring housing for attaching the coil spring, and wherein the coil spring housing and the rotatable gear piece are either a single, integrally formed unit or are attached together as separate pieces. The pet safety restraint device may further comprise a coil spring configured to be positioned inside of the coil spring cavity, at least one ball, wherein the at least one ball is configured to fit within a space of the spaces between each tooth of the rotatable gear piece when an inertial force is exerted on the pet safety restraint device, wherein the rotatable gear piece, the coil spring housing, and the coil spring are contained within the interior cavity of the cover housing. The pet safety restraint device may further comprise a base, wherein the base is configured to connect to an underside of the cover housing, wherein the pet safety restraint device is configured to couple to a pet harness to restrain a pet in a vehicle. In a non-limiting embodiment, the ball channel in the base is beveled and the ball channel in the ball insert piece is also beveled.

The pet safety restraint device of claim 1 may further comprise a rotatable gear piece further comprises one or more gear piece openings that extend through the body of the rotatable gear piece. The coil spring housing comprises one or more coil spring openings extending in an arrangement around a surface of the coil spring housing, wherein the surface defines the coil spring cavity. In a non-limiting embodiment, one or more pockets are machined into an underside of the base. The pet safety restraint device of claim 1 may further comprise a ball insert piece having a ball channel is not positioned in the spaces between each tooth, wherein the ball insert piece is contained within the interior cavity of the cover housing.

In a non-limiting embodiment, the pet safety restraint device describes a cover housing having an interior cavity as well as a rotatable gear piece having one or more teeth with spaces between each tooth. The device may further include a coil spring housing coupled to a topside of the rotatable gear piece, wherein the coil spring housing comprises a coil spring cavity, wherein the coil spring housing and the rotatable gear piece are either a single, integrally formed unit or are attached together as separate pieces. The device may further include a coil spring configured to be positioned inside of the coil spring cavity, as well as at least one ball, wherein the at least one ball is configured to fit within a space of the spaces between each tooth of the rotatable gear piece when an inertial force is exerted on the pet safety restraint device. The device may also include a ball insert piece having a ball channel configured to house the at least one ball when the at least one ball is not positioned in the spaces between each tooth, wherein the ball insert piece, the rotatable gear piece, coil spring housing, and coil spring are contained within the interior cavity of the cover housing.

The pet safety restraint device may further include a base, wherein the base is configured to connect to an underside of the cover housing, wherein the pet safety restraint device is configured to couple to a pet harness to restrain a pet in a vehicle. In a non-limiting embodiment, the pet safety restraint device may include a retractable leash. In a non-limiting embodiment, the retractable leash is coupled to the coil spring housing whereby one end of the retractable leash is wound around an outside surface of the coil spring housing and coupled to an underside of the cover housing. In a non-limiting embodiment, the retractable leash is configured to extend and retract while wound around an outside surface of the coil spring housing, whereby the retractable leash further comprises a fastener at an exteriorly visible end, wherein the fastener is configured to fasten to the pet harness holding the pet. Further, the ratchet strap is configured to fit within a slit integrated into a front surface of the cover housing. In a non-limiting embodiment, the coil spring housing and the rotatable gear piece comprise a pin hole, wherein the pin hole extends generally centrally through the coil spring housing and through the rotatable gear piece. A pin may fit within the pin hole and extend through the pin hole between the coil spring housing and rotatable gear piece. The base may further comprise a ball channel in the base, wherein the ball channel in the base aligns with the ball channel in the ball insert piece. The top surface of the base may be angled with the ball channel in the base located near a lower end of the top surface of the base, whereby the base comprises fastener holes located on one or more edges of the base. The fastener holes are configured to receive fasteners to fasten the base to the underside of the cover housing. In a non-limiting embodiment, the coil spring housing and the rotatable gear piece are coupled to a top surface of the base.

The present description may further include a method for using a pet safety restraint device in a vehicle. The method may further include providing the pet safety restraint device as noted above having one or more components noted above. The method may further include sliding a ratchet strap through a designated ratch strap slit included in the front surface of the cover housing. The method may further include connecting one or more ends of the ratchet strap to one or more anchor points within the vehicle, wherein the one or more ends of the ratchet strap hooks onto, clips onto, or otherwise attaches to the one or more anchor points of the vehicle. The method may further include connecting a fastener of the retractable strap to a pet harness positioned on a pet and allowing the pet to have a limited range of movement within the vehicle while fastened to the pet safety restraint device, such that the retractable strap is able to extend in and out of the pet safety restraint device giving the pet the limited range of motion within the vehicle. Responsive to the inertial force acting upon the vehicle and on the pet, the pet is restrained such that the at least one ball slides from the ball channel into a nearby space located between a tooth of the set of teeth of the rotatable gear piece. Responsive to the at least one ball sliding into the nearby space between the set of teeth of the rotatable gear piece, the retractable strap is prevented from further extension, thereby locking the retractable strap and restraining the pet in place. The method may further include connecting the one or more ends of the ratchet strip to child safety anchors in the vehicle or to the side edges of a seat in the vehicle where the pet is located. The pet safety restraint device prevents the pet from crashing forward and/or sideways in the vehicle. The pet safety restraint device is portable and removable from the vehicle.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

The present description is drawn to an innovative pet safety restraint device. In one or more non-limiting embodiments, the pet safety restraint device may include a cover. The cover of the pet restraint device is coupled to a base comprising one or more interior components such as a gear piece that is made as part of a single unit with or is otherwise coupled to a coil spring housing that includes a coil spring having multiple coils, in which a retractable strap can wind and unwind. In a non-limiting embodiment, the pet safety restraint device includes a ball that is configured to become lodged in a space between one or more teeth of a rotatable gear piece that can exert pressure on the retractable strap 121 and hold a pet in place. The pet safety restraint device may be an assembly of the components listed above and may form a body of the pet safety restraint device. The pet safety restraint device may be removably yet securely attached to a vehicle seat or other location in a vehicle in order to be used as needed by a pet owner. The pet safety restraint device may be coupled to a retractable cord/strap and to a pet harness in one or more non-limiting embodiments that can be worn on the pet. Further details are provided below with respect to the Figures.

Figure 1:
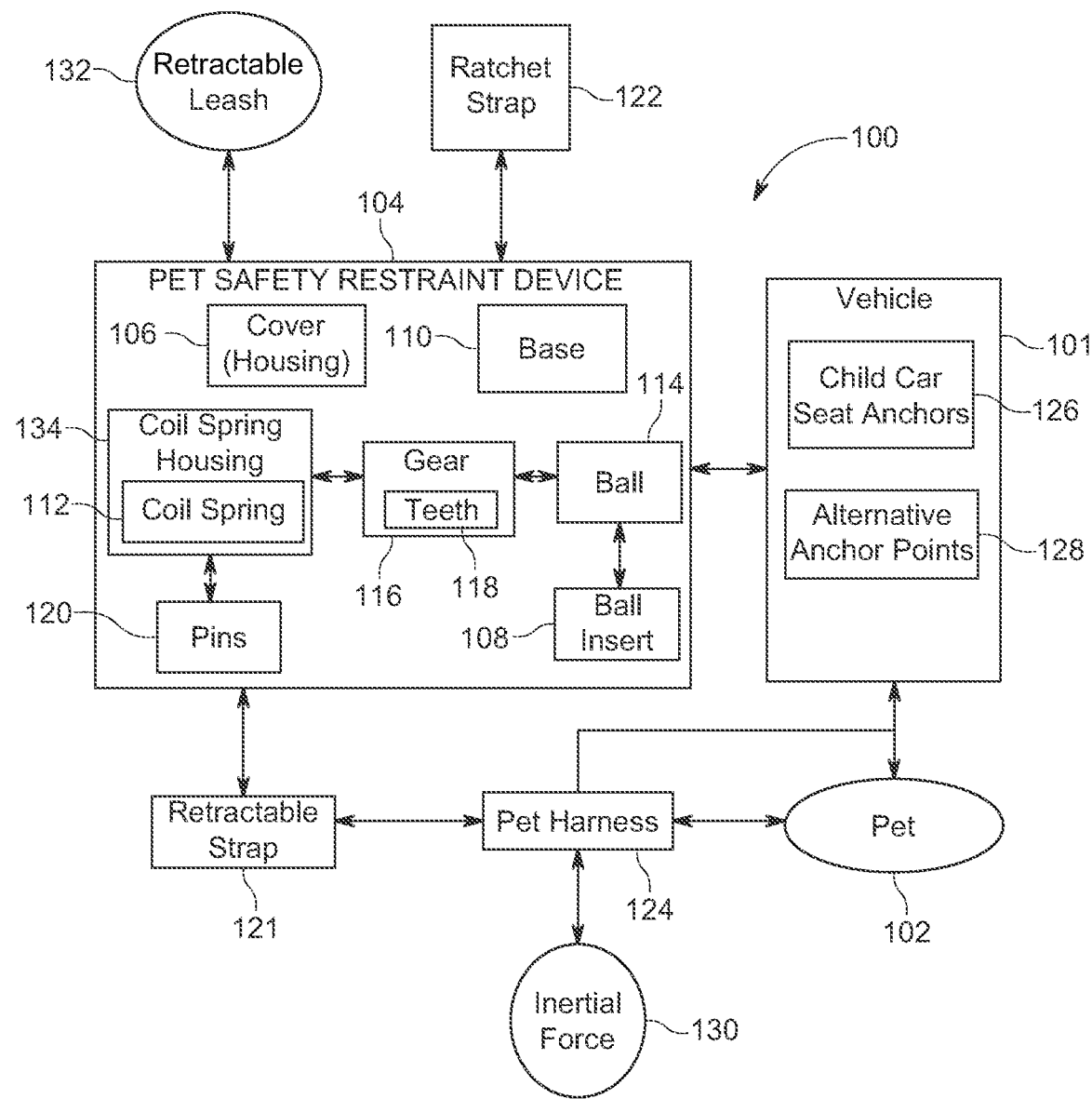
FIG. 1 depicts a block diagram for an exemplary system and components for a pet safety restraint device.

Turning to FIG. 1, FIG. 1 shows exemplary components of the system 100 that includes a pet safety restraint device 104. In a non-limiting embodiment, the pet safety restraint device 104 can function and act like a seat belt or other element that protects pet 102 in vehicle 101 from being thrown from the vehicle 101 or crashing into one or more sides or surfaces of the vehicle 101 in case of an unwanted accident or sudden stop. The pet safety restraint device 104 thus minimizes the pet's 102 free range of movement within the vehicle 101, but also permits the pet 102 to still have a limited amount of movement in the vehicle as further discussed below.

In a non-limiting embodiment, the pet safety restraint device 104 may be a standalone unit. In other non-limiting embodiments, the pet safety restraint device 104 may be incorporated into or coupled to a retractable leash 132.

As shown in FIG. 1, in a non-limiting embodiment, the pet safety restraint device 104 may couple to a retractable strap 121. Further, in a non-limiting embodiment, a ratchet strap 122 (e.g., as shown in FIGS. 3A-3D) may extend through a front surface 254 (e.g., surface 214 of front surface 254 as shown in FIGS. 3B-3C) of the pet safety restraint device 104 and may be used to attach the pet safety restraint device 104 to one or more parts of a vehicle 101. In some instances, the user may couple the pet restraint safety device 104 to the child car seat anchors 126 (e.g., as shown in FIG. 3B) that are usually included in vehicles 101 and used to connect and stabilize attachment of a child car seat. Alternatively, or additionally, the pet safety restraint device 104 may be coupled to alternative anchor points 128 within the vehicle 101. For example, the ratchet strap 122, in one or more non-limiting embodiments, may include hooks (e.g., such as hook 302b shown in FIG. 3A) that may be removably attached or hooked onto one or more sides 316 of a vehicle seat 312, as shown in FIG. 3B and FIG. 3D. Other locations and attachment points within a vehicle 101 may serve for coupling a ratchet strap 122 of the pet safety restraint device 104 as well.

The pet safety restraint device 104 may be connectable to a retractable strap 121. In one or more non-limiting embodiments, the retractable strap 121 may connect to a pet harness 124 that may be placed on a pet 102. The pet harness 124 may be removable and placed on the pet 102 when the manager/owner of the pet 102 is transporting the pet 102 in the vehicle 101. In a non-limiting embodiment, the retractable strap 121 couples to the part of the pet harness 124 positioned over a back or chest area of the pet 102. It may be desirable to avoid coupling the retractable strap 121 to the neck of the pet 102 or collar of the pet 102 so as not to accidentally choke the pet 102 in case the pet restraint safety device 104 is activated and the retractable strap 121 pulls too hard on the neck or collar of the pet 102. Rather, it is preferable that the retractable strap 121 pulls on the pet harness 124 worn over the body of the pet 102. One or more clips, such as clips 202, 204 shown in FIGS. 2A-2B may be used to also clip the retractable strap 121 to the pet harness 124. The retractable strap 121 may be adjustable between clips 202 and 204 in one or more non-limiting embodiments so the user can lengthen or retract the strap 121 as needed.

It is noted that in one or more non-limiting embodiments, the retractable strap 121 is retractable and can recoil. Further, the retractable strap 121 can lengthen and shorten as needed. Further, the pet 102 can be attached to pet safety restraint device 104 via the retractable strap 121 while moving around in the back seat or front seat of a vehicle 101. The pet 102 is thus provided with a limited range of movement when in the vehicle 101, which is desirable as the pet 102 is not prevented from looking out the windows of the vehicle 101 or engaging with the owner or other people in the vehicle 101, but is protected by the attachment to the pet safety restraint device 104. In other non-limiting embodiments, the retractable strap 121 may not be retractable and has a fixed length.

As further explained below, the pet safety restraint device 104 is an inertia based locking device that gives the pet 102 some freedom of movement within the vehicle 102 due to the retractable strap 121, but that is also configured to restrain and lock in order to pull back on the pet harness 124 of the pet 102 if an inertial force 130 is exerted and acts upon the pet safety restraint device 104 (e.g., such as during an accident/crash/sudden stop of the vehicle 101).

Figure 12:
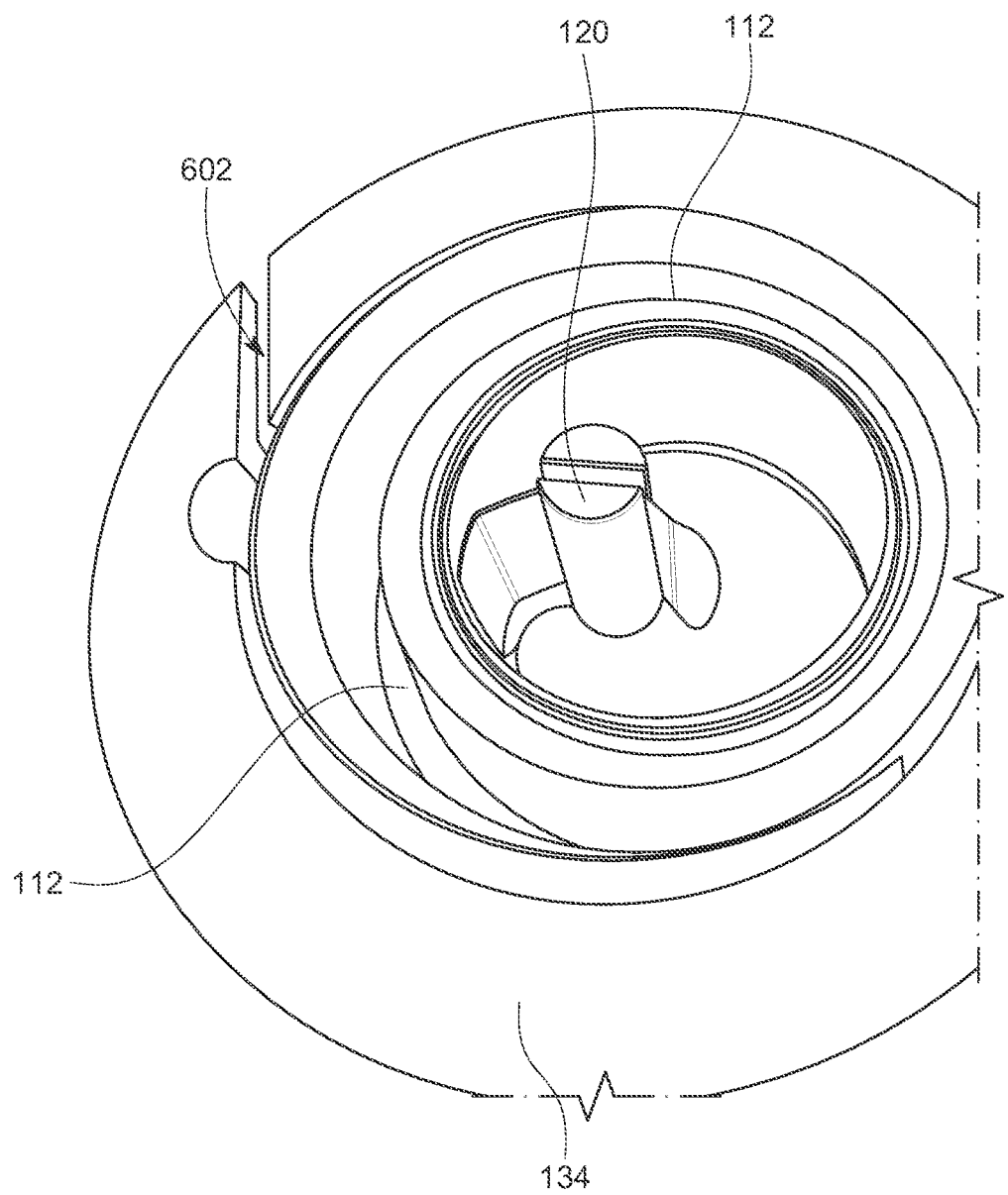
FIG. 12 depicts an exemplary pin extending through the coil spring housing containing a coil spring.
Figure 13:
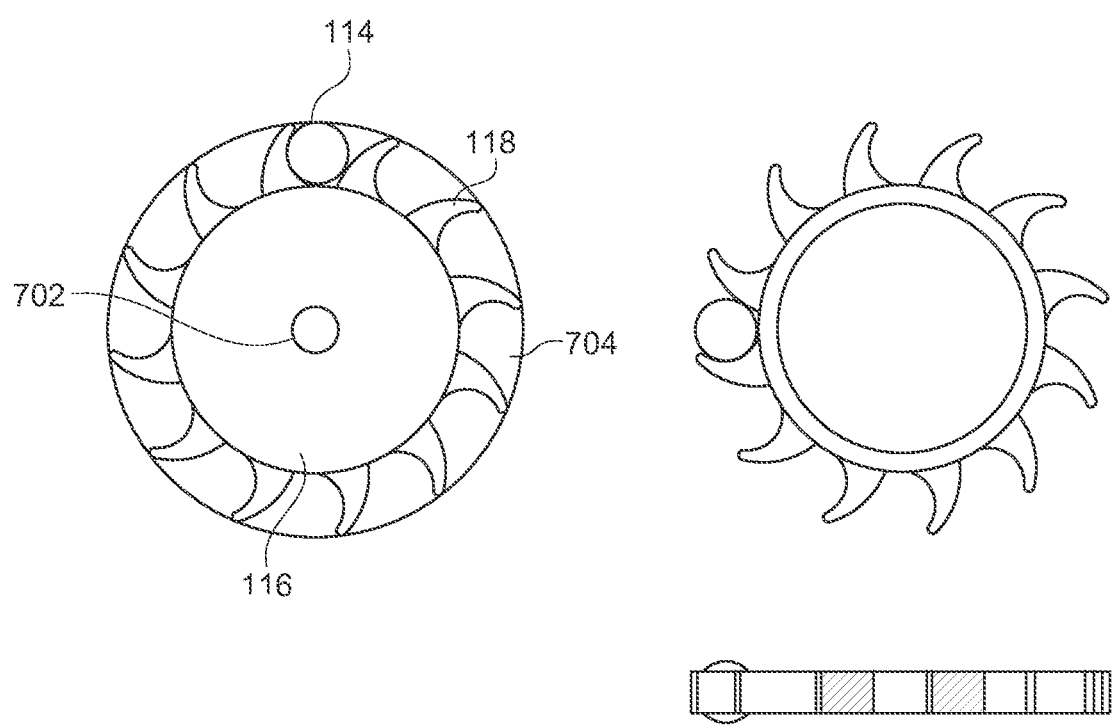
FIG. 13A depicts an illustration of an exemplary ball lodged within one of the teeth spaces of a gear piece for the pet safety restraint device.
FIG. 13B depicts an illustration of an exemplary ball lodged within the gear piece.
FIG. 13C depicts an illustration of a side view of the exemplary ball lodged within the gear piece.
Figure 14:
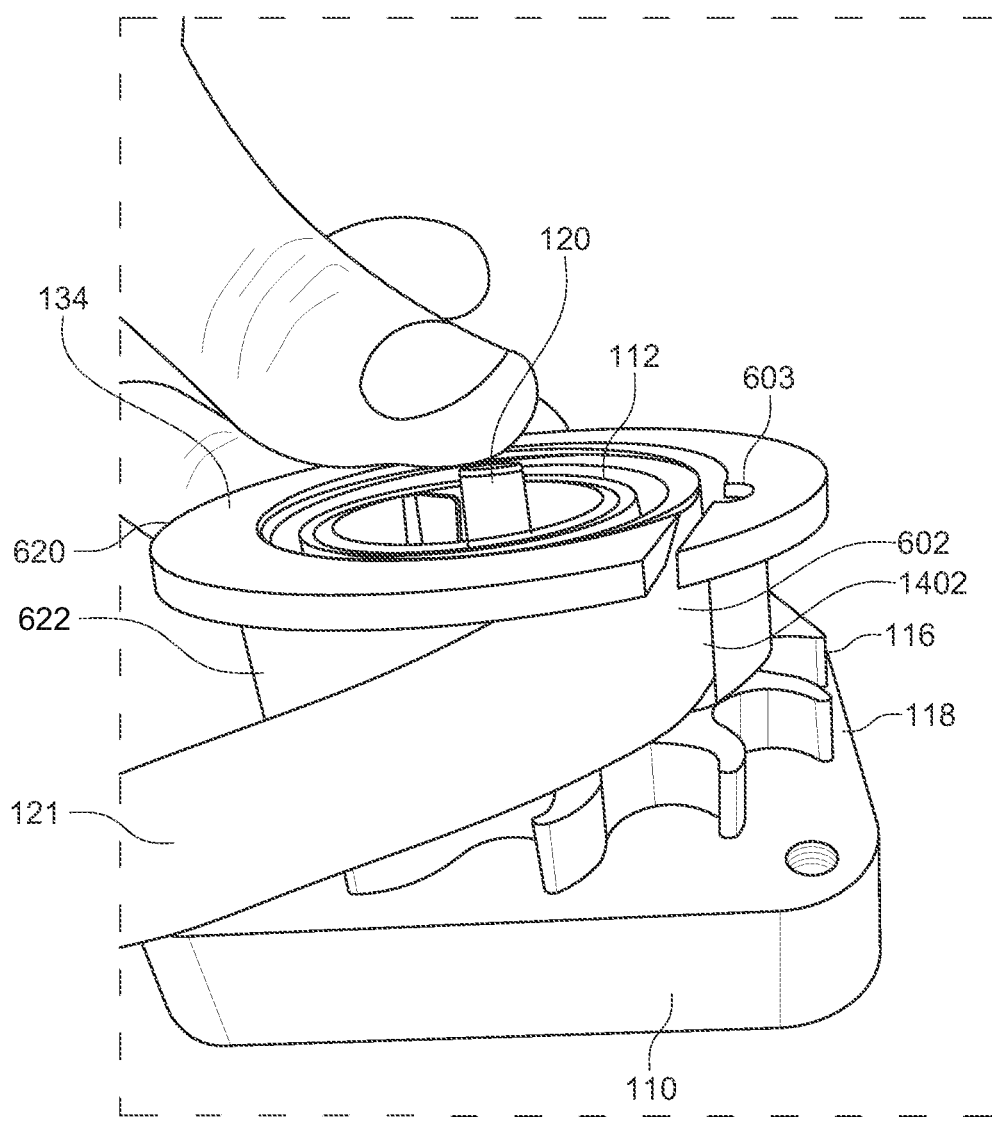
FIG. 14 depicts an illustration of a retractable strap posited on an outside of a coil spring housing and inserted in a channel of the coil spring housing.
Figure 15:
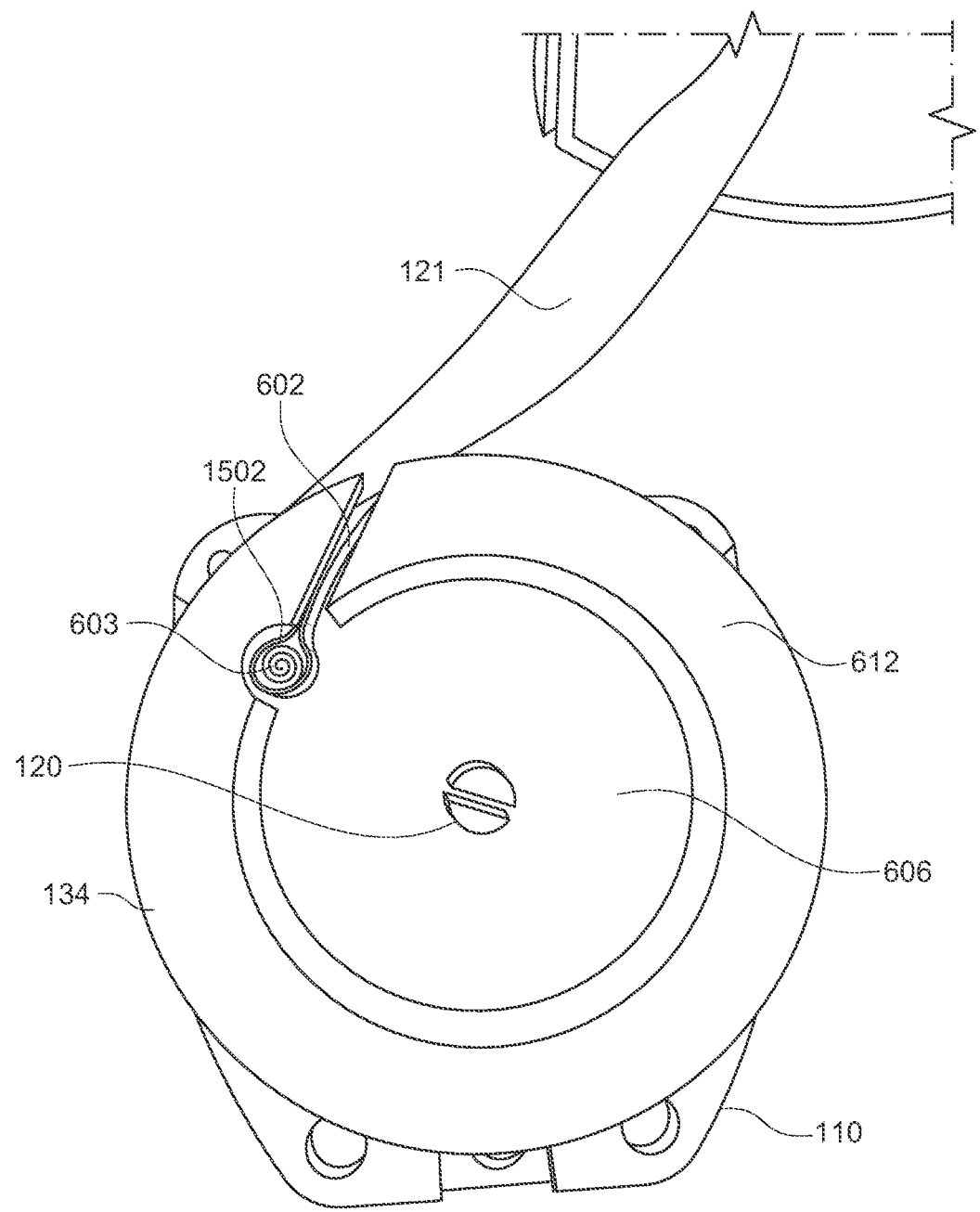
FIG. 15 depicts an illustration of an empty interior cavity of the coil spring housing shown in FIG. 14 and the retractable strap inserted into a groove within the interior of the empty coil spring housing.

In one or more non-limiting embodiments, the pet safety restraint device comprises a cover housing 106 that is attachable to a base 110. The cover 106 acts as a housing to house the interior components of the pet safety restraint device 104 as assembled together to make the pet safety restraint device 104 operational according to principles of inertia and physics, as further explained below. In a non-limiting embodiment, within the interior of the cover housing 106 may be a coil spring housing 134 containing a coil spring 112 as shown in a non-limiting embodiment in FIG. 12. In a non-limiting embodiment, the retractable strap 121 is wound around the outside of the coil spring housing 134 as shown in FIGS. 13-15. The coil layers of the coil spring 112 may further have a spring recoil characteristic. In a non-limiting embodiment, it may be preferable for the coil spring 112 to be a constant force type of coil spring 112. In alternative embodiments, the coil spring 112 may be a variable force type of coil spring.

In one or more non-limiting embodiments, the coil spring housing 134 may be coupled to a gear piece 116 having several teeth 118 (e.g., as shown in FIGS. 6-9A and FIGS. 11-12). The coil spring housing 134 that is coupled to the gear piece 116 may be considered an assembly.

Figure 6:
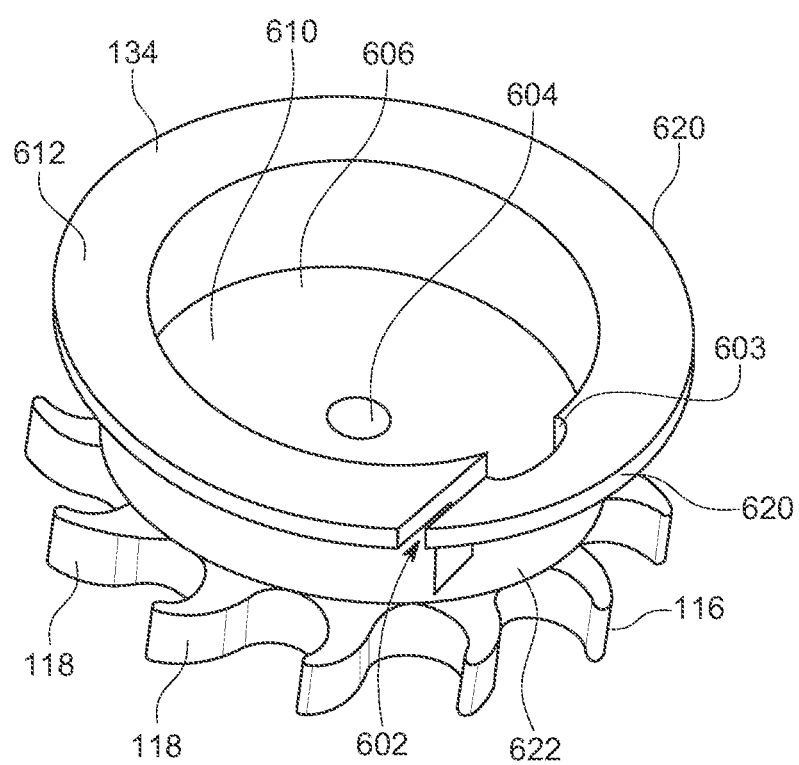
FIG. 6 depicts a top perspective view of a coil spring housing and a gear piece from the pet safety restraint device.
Figure 16:
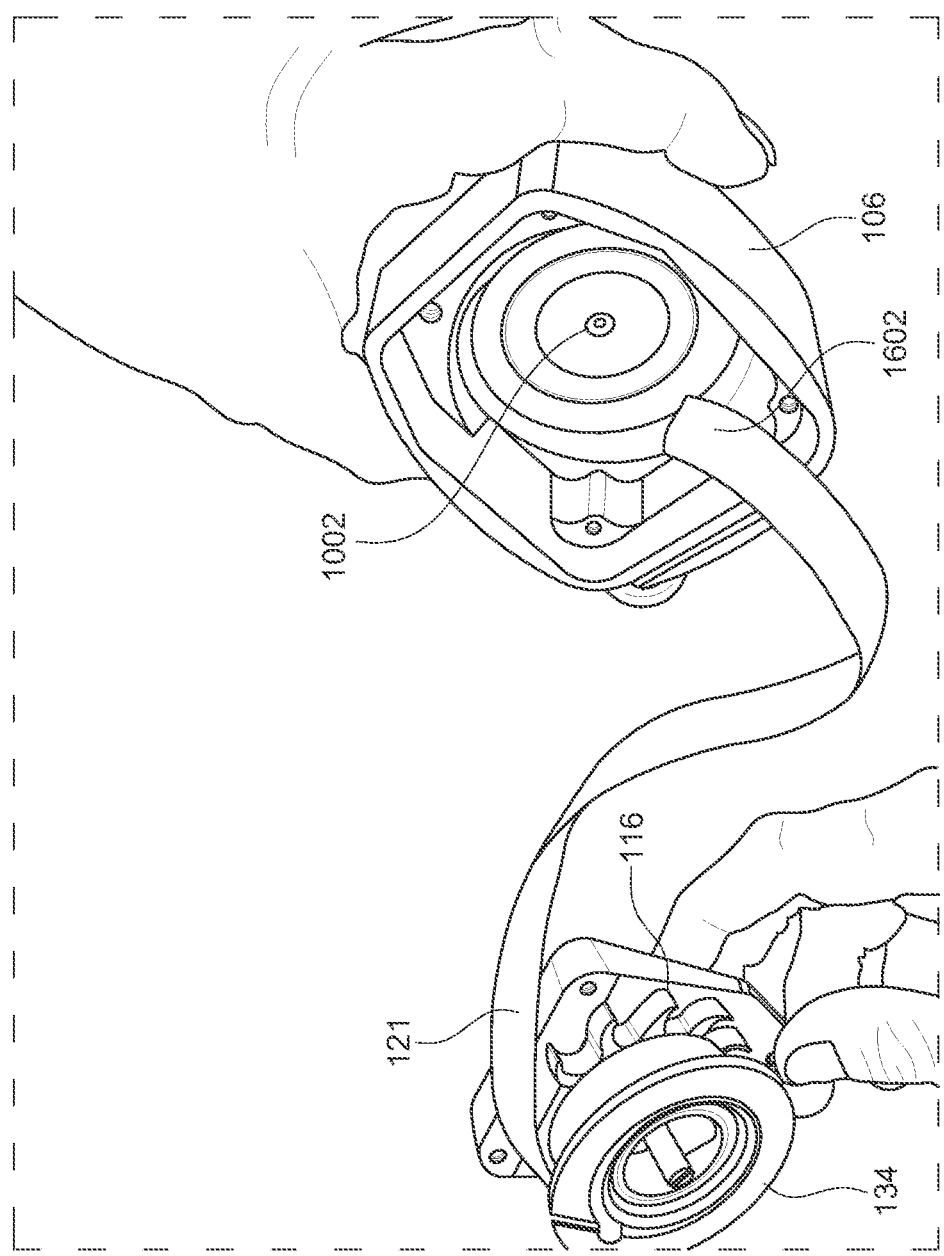
FIG. 16 depicts an illustration of a coil spring housing with the retractable strap housing wrapped around an outside surface of the coil spring housing and connected to an interior of the cover at one end of the retractable strap.

In a non-limiting embodiment, the gear piece 116 may have several functions. The gear piece 116 may be used as a locking mechanism as further explained below when the ball 114 rolls forward into the spaces 704 between the gear teeth 118 (e.g., as shown in FIGS. 13A-13C). The coil spring housing 134 may also have specific functions. In a non-limiting embodiment, the coil spring housing 134 may house the coil spring 112. Further, as shown in FIGS. 14-16, the retractable strap 121 may be wrapped around an outside surface 622 (e.g., as shown in FIG. 6) on the coil spring housing 134 and one end 1502 of the retractable strap 121 may be positioned or attached within a groove 603 in the coil spring housing 134 (e.g., as shown in FIG. 12). Further, in a non-limiting embodiment, another end 1602 of the retractable strap 121 may be connected to a portion of the interior 1002 of the cover 106 as shown in FIG. 16. Accordingly, the coil spring housing 134 includes a surface and location for the retractable strap 121 to be attached to. The retractable strap 121 can extend some length to provide the pet 102 with some degree of movement within the vehicle 101, but can also retract to minimize the distance the pet 102 can travel or move within the vehicle 101. The coil spring housing 134 further provides a support for the recoil of the coil spring 112.

Figure 9A:
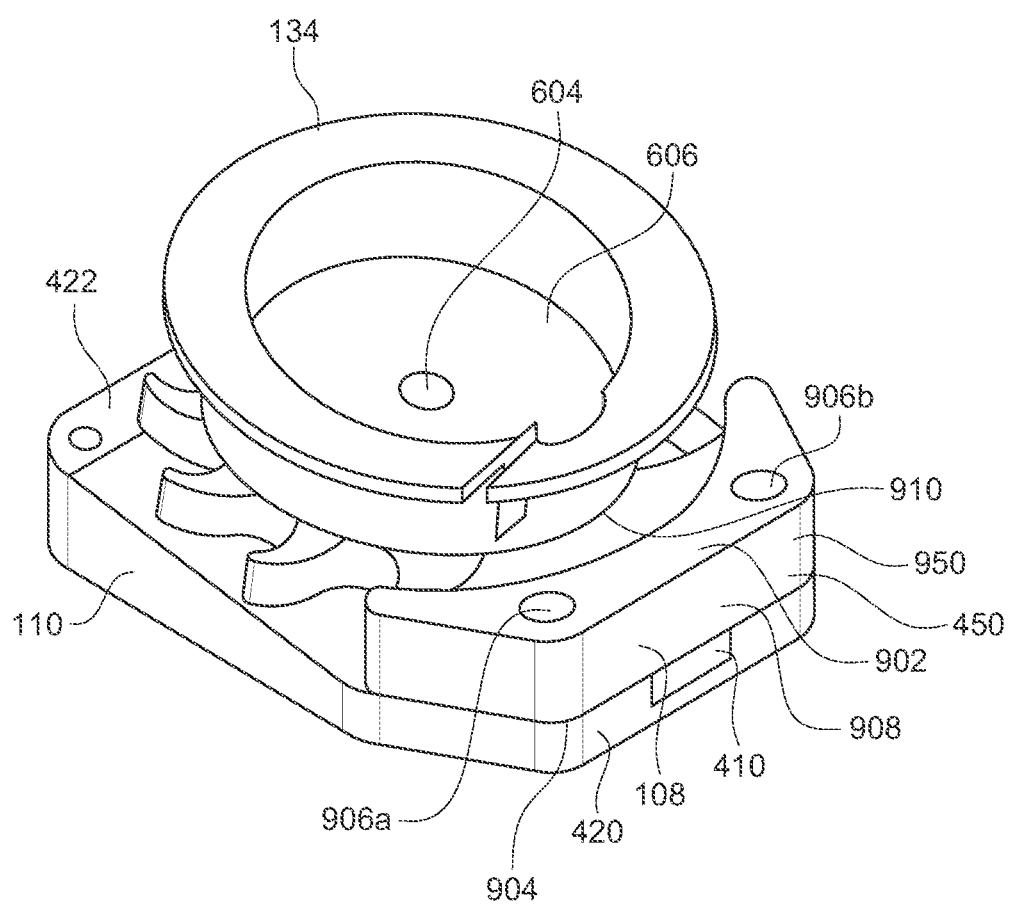
FIG. 9A depicts a coil spring housing and gear piece assembly positioned on the top of the base as shown in FIG. 8 and a ball insert added to the pet safety restraint device.

The assembly of the coil spring housing 134 and gear piece 116 may have one or more pins 120 that extend through one or more central bores/holes of the coil spring housing 134 and gear piece 116 in order to connect the pieces 134 and 116 together when positioned within the interior of the cover 106 and positioned over the base 110 of the pet safety restraint device 104 (e.g., as shown in FIG. 9A). The center pin 120 provides an attachment point for the coil spring 112 to wind and unwind upon in a non-limiting embodiment. Further the pin 120 may provide support for the gear 116 to rotate upon, as well as a structural connection point for the cover 106 and the base 110, whereby the cover 106 and the base 110 serve to keep internal components in place.

Figure 7:
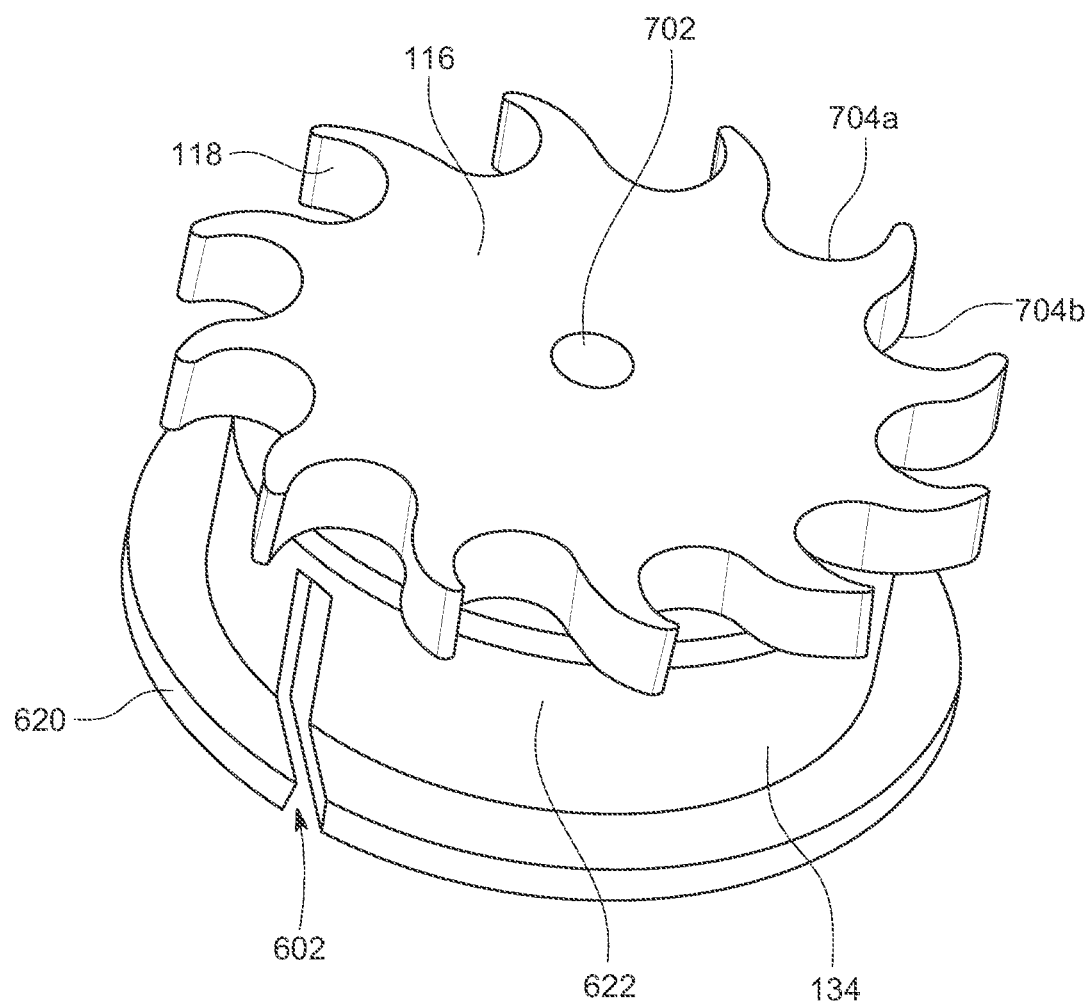
FIG. 7 depicts a gear piece made with or coupled to a coil spring housing of the pet safety restraint device.

In a non-limiting embodiment, the gear piece 116 includes several teeth 118, such as the teeth 118 shown on the exemplary gear piece 116 as shown in FIGS. 6-7 and FIGS. 11-13. Each tooth 118 may be separated by a gap or space, as shown in FIG. 7, including spaces 704a, 704b, 704x. There may be several teeth 118 and spaces 704 on the gear piece 116 as needed depending on the size or efficiency of the pet safety restraint device 104. Further, the gear piece 116 is configured to rotate around the center pin 120 when the ball 114, as shown in FIG. 13A, is not lodged in between any teeth 118. If the ball 114 is lodged in the spaces 704 between the teeth 118, then the gear piece 116 is prevented from rotating and in turn, the retractable strap 121 is prevented from unwinding and is also locked by the attached coil spring housing 134 and coil spring 112.

In a non-limiting embodiment, the pet safety restraint device 104 is an inertia-based restraint device. As understood and known due to the laws of physics, inertia is the principle that a property of matter is that a thing or object or person continues in its existing state of rest or uniform motion in a straight line, unless that state is changed by an external force. As known in the art, when the vehicle 101 is moving, if a pet 102 is unrestrained by the pet safety restraint device 104 or any other restraint device, and an unexpected change in speed or acceleration occurs to the vehicle 101, such as a crash, causing the vehicle 101 to suddenly stop, the pet 102 will fly into and/or through the windows or other surfaces of the vehicle 101 because the inertia of the pet 102 causes the pet 102 to maintain its same motion.

In order to hold the pet 102 back and in place against a seat of a vehicle 101, the pet safety restraint device 104 has one or more interior components (e.g., coil spring housing 134, coil spring 112, rotatable gear 116, teeth 118, ball 114) that may be configured and designed to cause the pet safety restraint device 104 to be activated and operate as a seat belt would in that the pet safety restraint device 104 acts as an external restraining device that can hold the pet 102 and prevent the pet 102 from flying to the front and/or sides of the vehicle 101 and through the windows of the vehicle 101 in case there is an accident and/or crash.

Accordingly, if an external inertial force 130 is exerted on the pet restraint safety device 104, in a non-limiting embodiment, the one or more balls 114 positioned within the pet safety restraint device 104 is caused to roll towards an open space (e.g., space 704a, 704b as shown in FIG. 7 and spaces 704 shown in FIG. 13A) between each tooth 118 of the rotating gear piece 116. Accordingly, the ball 114 acts as the central object of inertia and is used for initiating the locking activity of the pet safety restraint device 104. When the ball 114 becomes lodged in one of the spaces 704 of the teeth 118 of the rotating gear piece 116, the ball 114 stops the gear piece 116 from spinning or rotating and stops the retractable strap 121 from extending and exerts a locking action to hold the retractable strap 121, which is connected to the pet harness 124 worn by the pet 102. Thus, the pet safety restraint device 104 may prevent the unrestricted movement of the pet 102 within the vehicle 101, including when an accident occurs and hold the pet 102 close against one or more seats of the vehicle 101.

Figure 8:
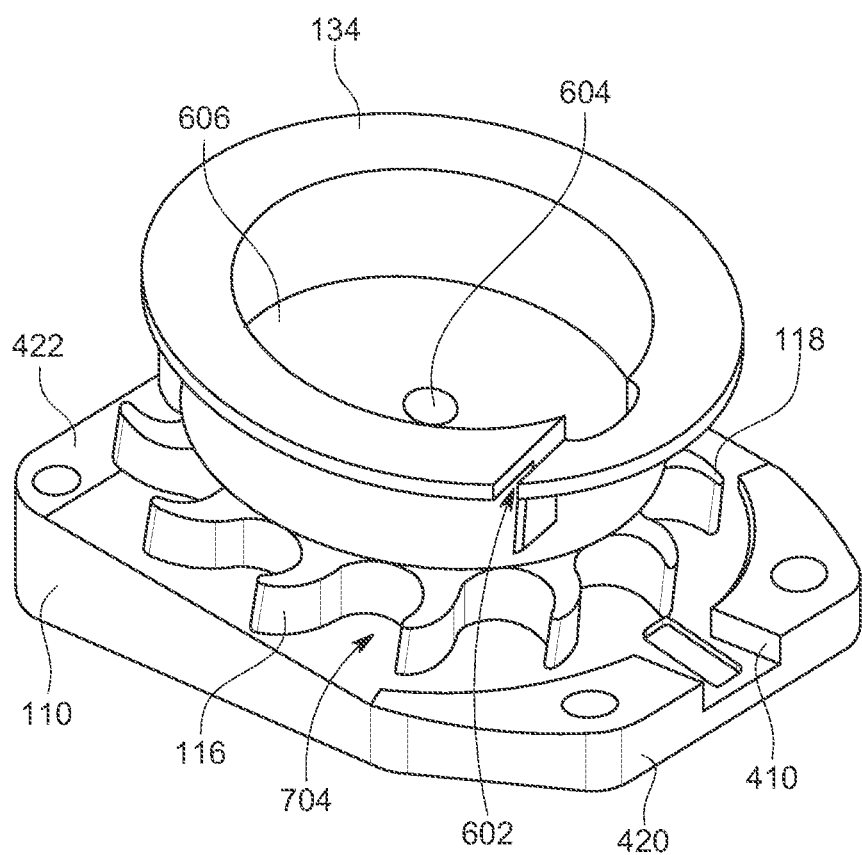
FIG. 8 depicts a coil spring housing and gear piece assembly positioned on the top of the base of the pet safety restraint device.
Figure 9B:
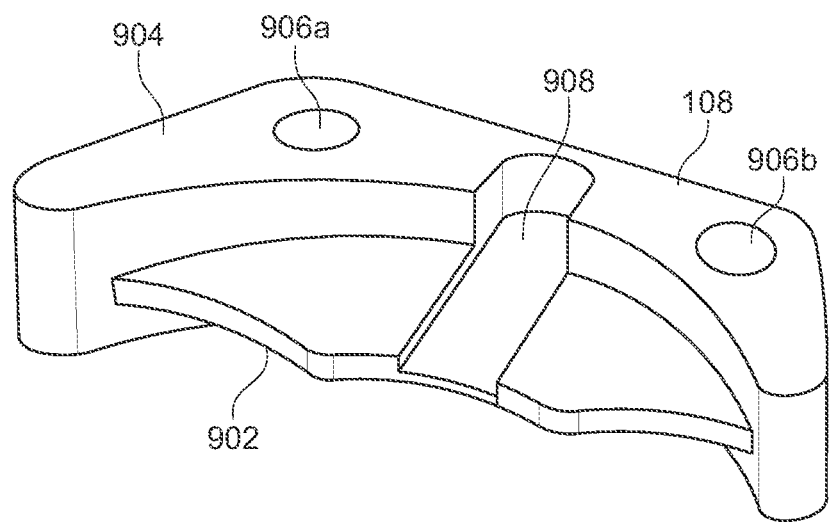
FIG. 9B depicts a bottom view of the ball insert shown in FIG. 9A.
Figure 9C:
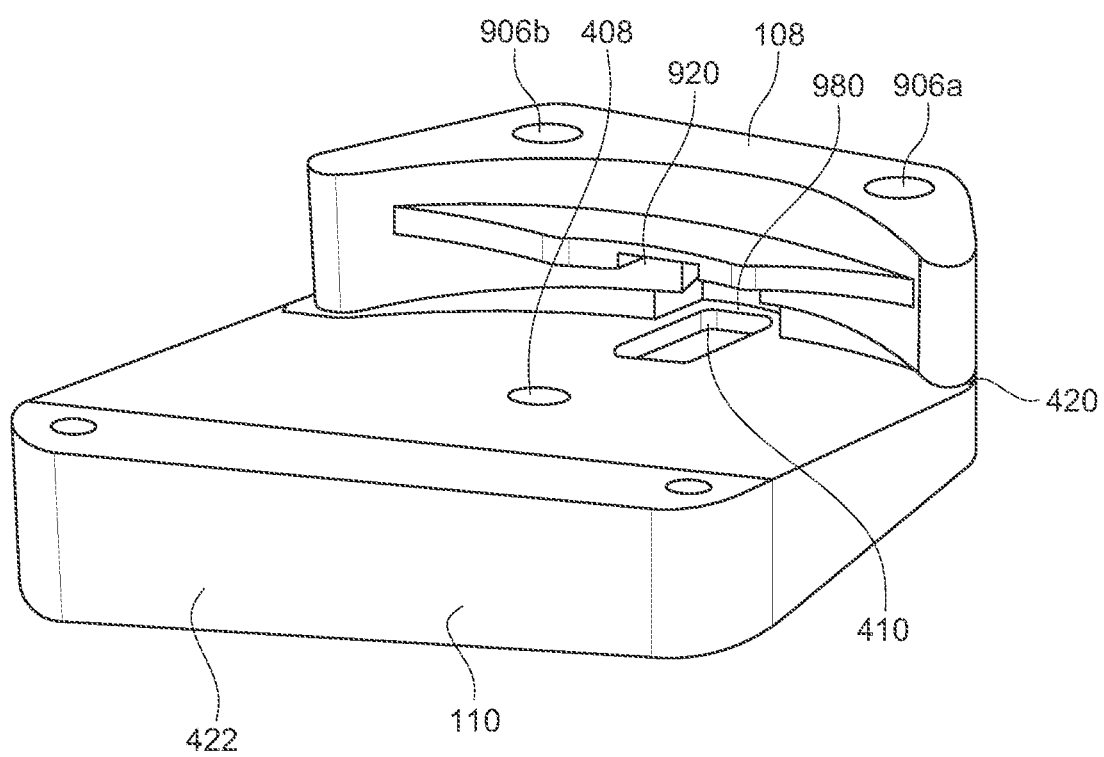
FIG. 9C depicts a view of the front side of the base of the pet safety restraint device with the ball insert shown in in FIG. 9A on the base.

FIGS. 8-9C show an exemplary base 110, ball insert 108, and embedded ball channels (e.g., ball channel 410 on base 110 shown in FIG. 4 and ball insert ball channel 920 shown in FIGS. 9B-9C) that may be integrated into the pet safety restraint device 104 in order to house the ball 114 when the ball 114 is not lodged in one or more spaces 704 in between one of the teeth 118 of the gear 116. More details regarding these components are provided later below with respect to these FIGS. 8-9C.

Figure 2A:
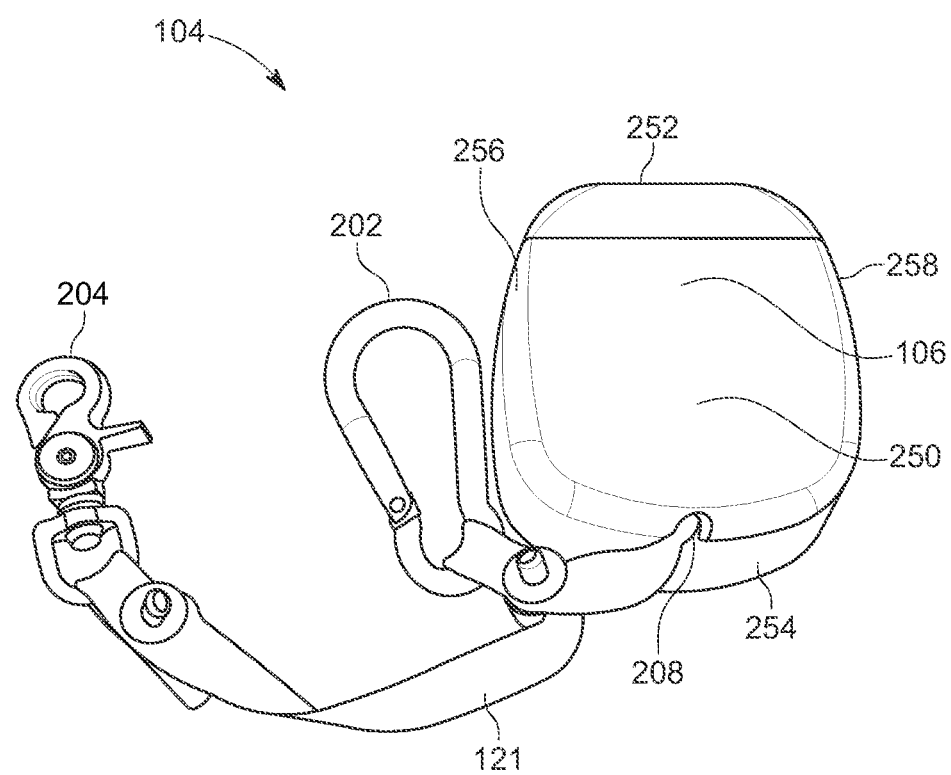
FIG. 2A depicts a top view of an exemplary pet safety restraint device.
Figure 2B:
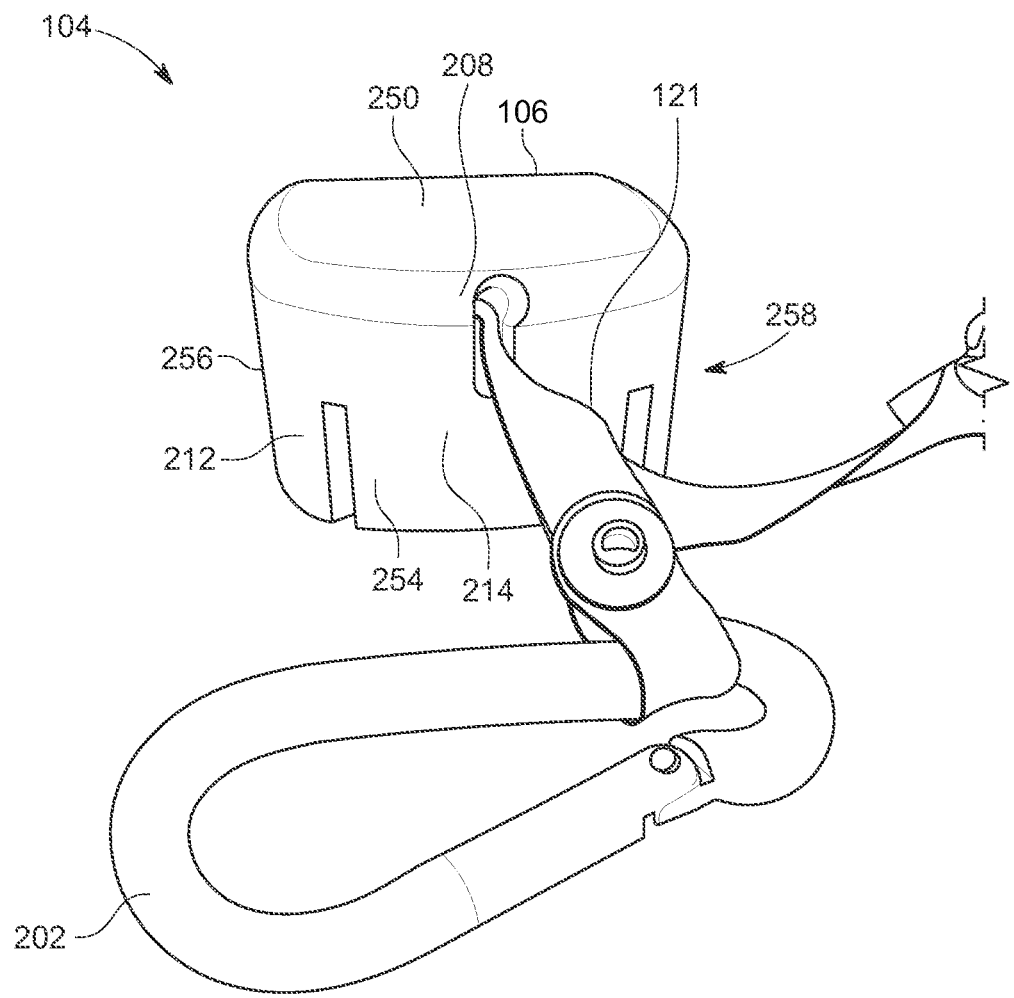
FIG. 2B depicts a front view of an exemplary pet safety restraint device.
Figure 2C:
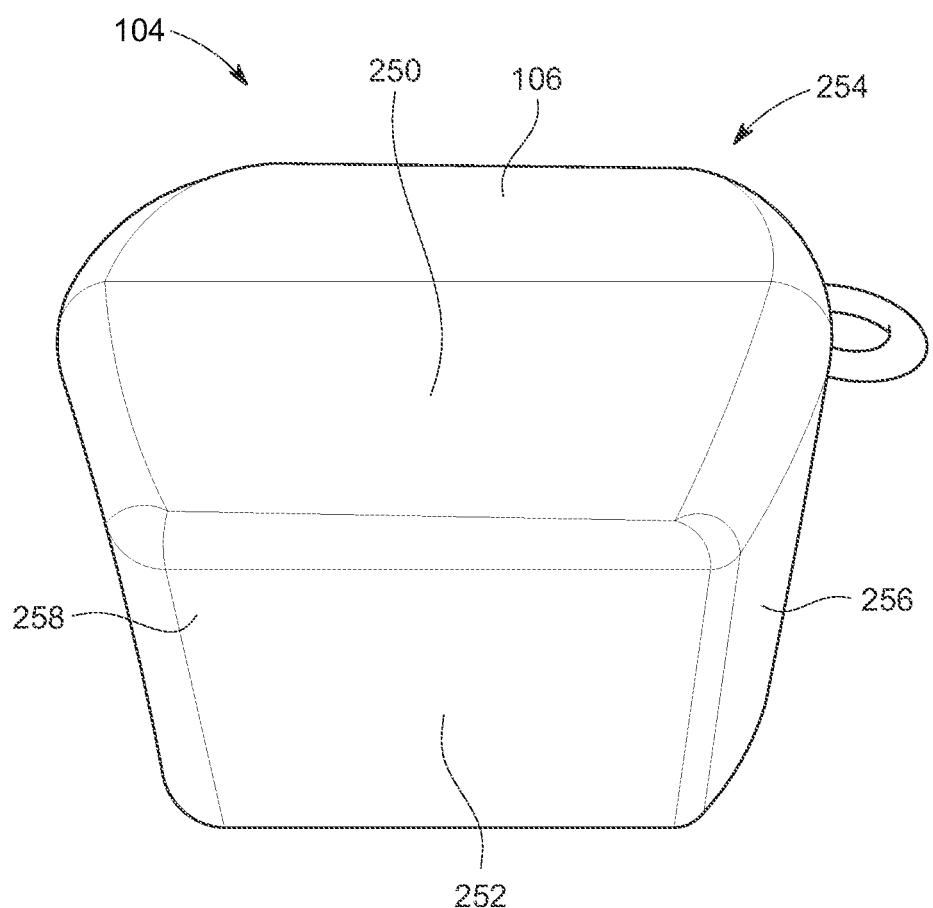
FIG. 2C depicts a back view of an exemplary pet safety restraint device.
Figure 2D:
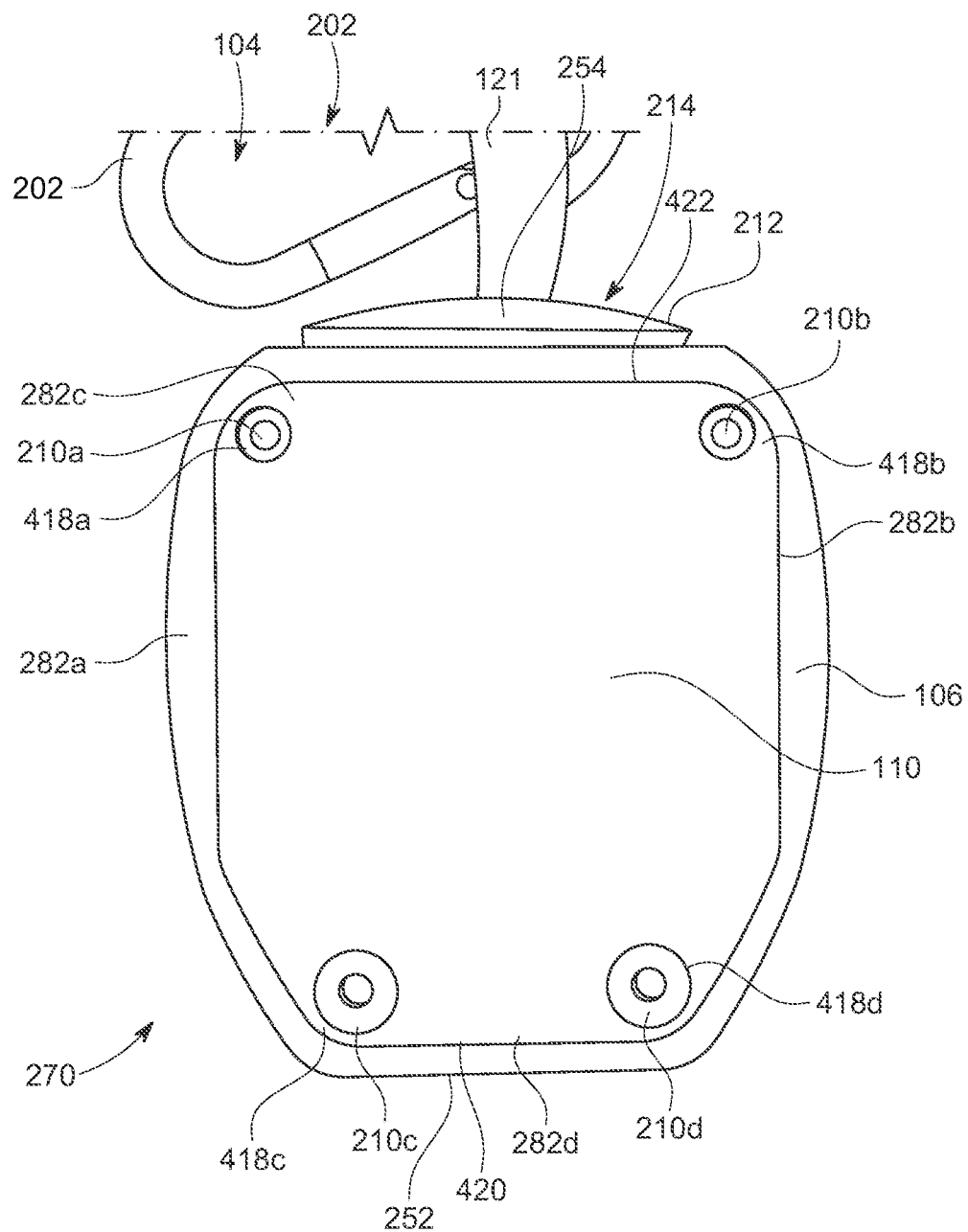
FIG. 2D depicts a bottom view of an exemplary pet safety restraint device.

FIGS. 2A-2D provide various views of an exemplary, non-limiting embodiment of the pet safety restraint device 104. FIG. 2A shows a top view, FIG. 2B shows a front view, FIG. 2C shows a back view, and FIG. 2D shows a bottom view of an exemplary pet safety restraint device 104.

An exemplary cover housing 106 is shown in FIGS. 2A-2C for the pet safety restraint device 104. FIG. 2D shows an exemplary base 110 for the pet safety restraint device 104. As shown in FIGS. 2A-2C, a top 250 of the pet safety restraint device 104 may be sloped and curve downwards from the front side 254 towards the back side 252 of the pet safety restraint device 104 in a non-limiting embodiment. In a non-limiting embodiment, the front side 254 of the cover 106 may further include an opening or notch 208 cut into the front side 254. It is noted that in a non-limiting embodiment, the retractable strap 121 may be inserted into a plastic insert (or an insert made from other type of material) that is sized to fit the notch 208 on the front side 254 of the cover 106. The insert may allow a retractable strap 121 and/or leash to fit the notch 208 better and more securely.

A retractable strap 121 may extend from the interior of the cover 106 of the pet safety restraint device 104 through the notch 208 in the front side 254. One or more clips or fasteners, such as clip 202 and clip 204 may be coupled to the retractable and adjustable strap 121 as shown in in a non-limiting embodiment in FIGS. 2A-2B. The fasteners 202 and 204 may be utilized to clip the retractable and adjustable strap 121 to a pet harness 124 worn by a pet 102 when the pet 102 is in the vehicle 101 in one or more non-limiting embodiments. The pet restraint device 104 may further include a smooth right side 256 and left side 258 as shown in FIG. 2C.

Figure 10A:
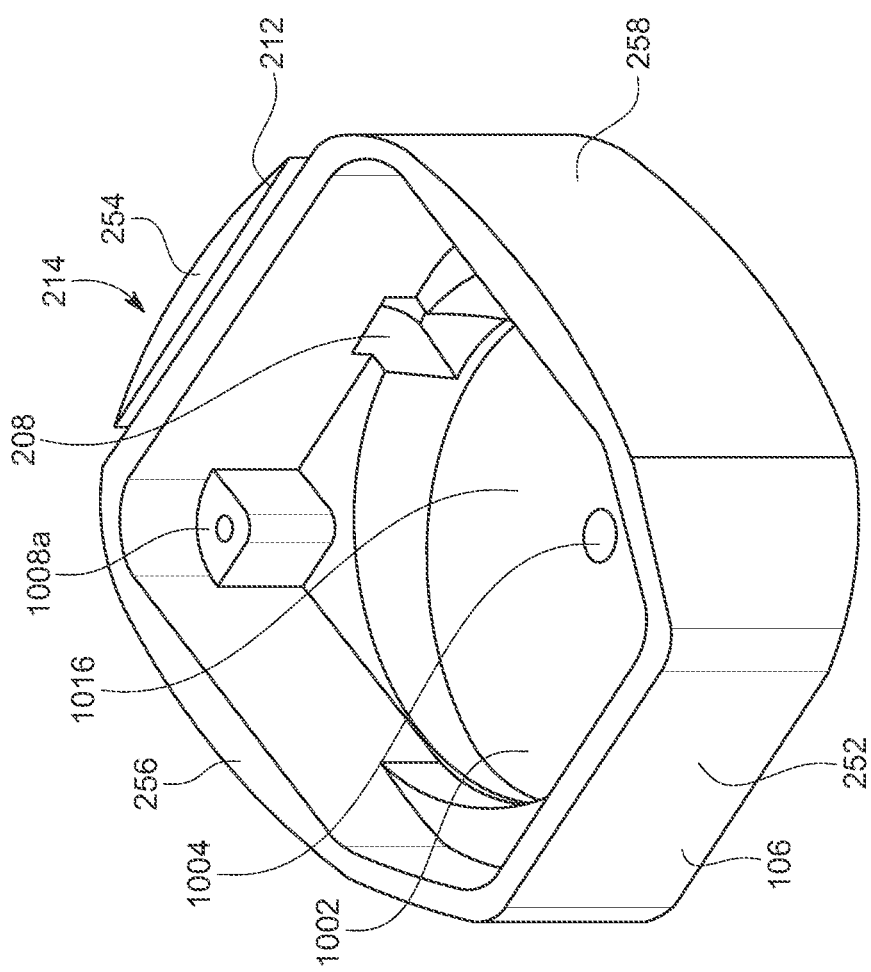
FIG. 10A depicts an interior view of a cover piece for the pet safety restraint device.
Figure 10B:
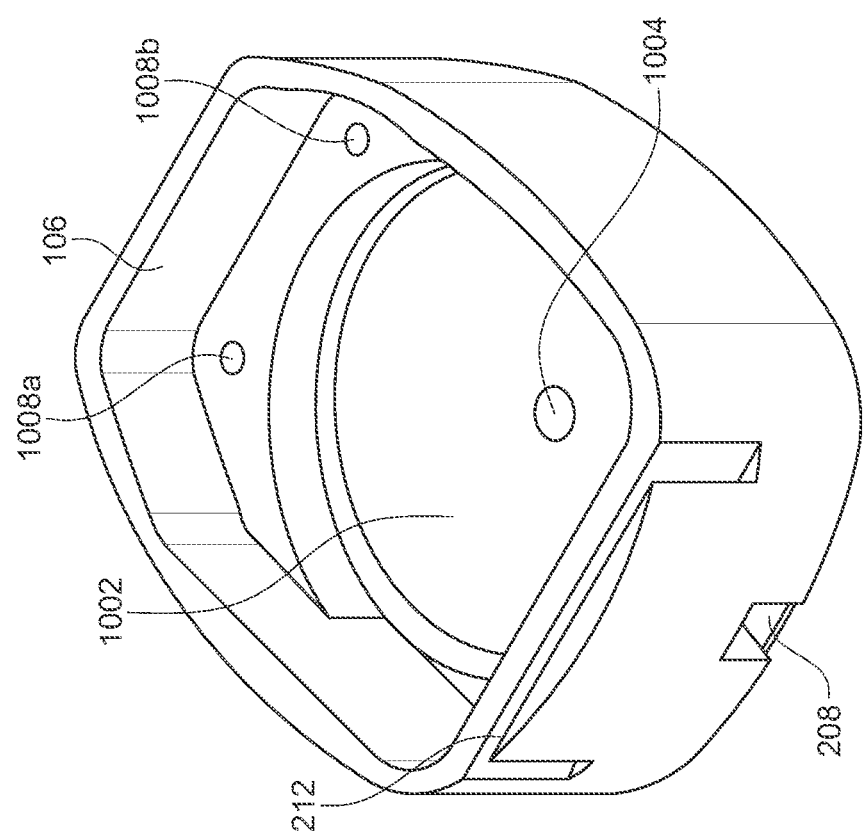
FIG. 10B depicts another interior view of the interior of the cover shown in FIG. 10A.

FIG. 2B shows that in a non-limiting embodiment there may be a ratchet strap slit 212 machined or otherwise integrated into the front side 254 of the cover 106 of the pet safety restraint device 104 so as to form a separated front piece 214 that is separated by the slit 212. The slit 212 may be dedicated for placing or inserting a ratchet strap 122 (e.g., as shown in FIGS. 3A-3D. The ratchet strap 122 may be used in one or more non-limiting embodiments to securely attach the pet safety restraint device 104 to parts or portions of a vehicle 101 when a pet 102 is restrained in the vehicle 101. FIGS. 10A-10B further show the ratchet strap slit 212 machined into the cover 106 and FIGS. 10A-10B show clearly the ratchet strap slit 212 from a bottom view of the cover 106. In a non-limiting embodiment, the ratchet strap slit 212 is cut deeply into the portion 214 of the front side 254 of the cover 106 without cutting all the way to the top side 250 of the cover 106 as shown in FIGS. 10A-10B.

FIG. 2D shows the base 110 as being flat from the exterior view. In other non-limiting embodiments, there may be recessed squares added to the bottom surface 404 of the base 110. The recessed squares may be useful to make the pet safety restraint device 104 lighter and for manufacturing purposes.

Figure 3A:
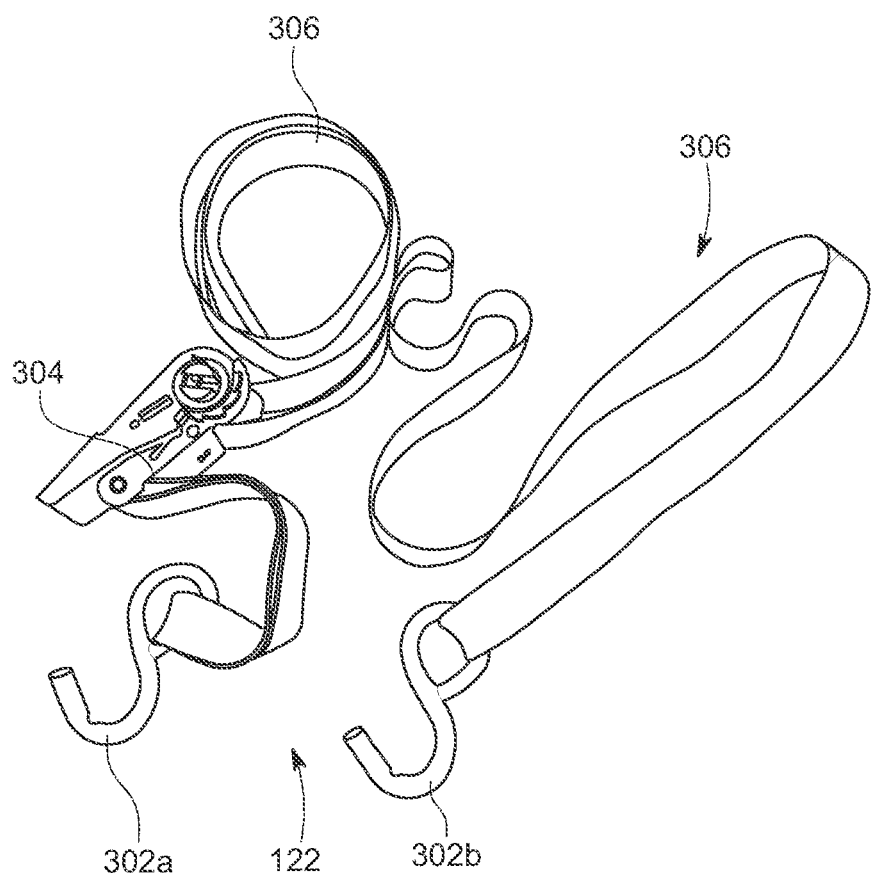
FIG. 3A depicts an exemplary ratchet strap that may be used to attach the pet safety restraint device to a vehicle.
Figure 3B:
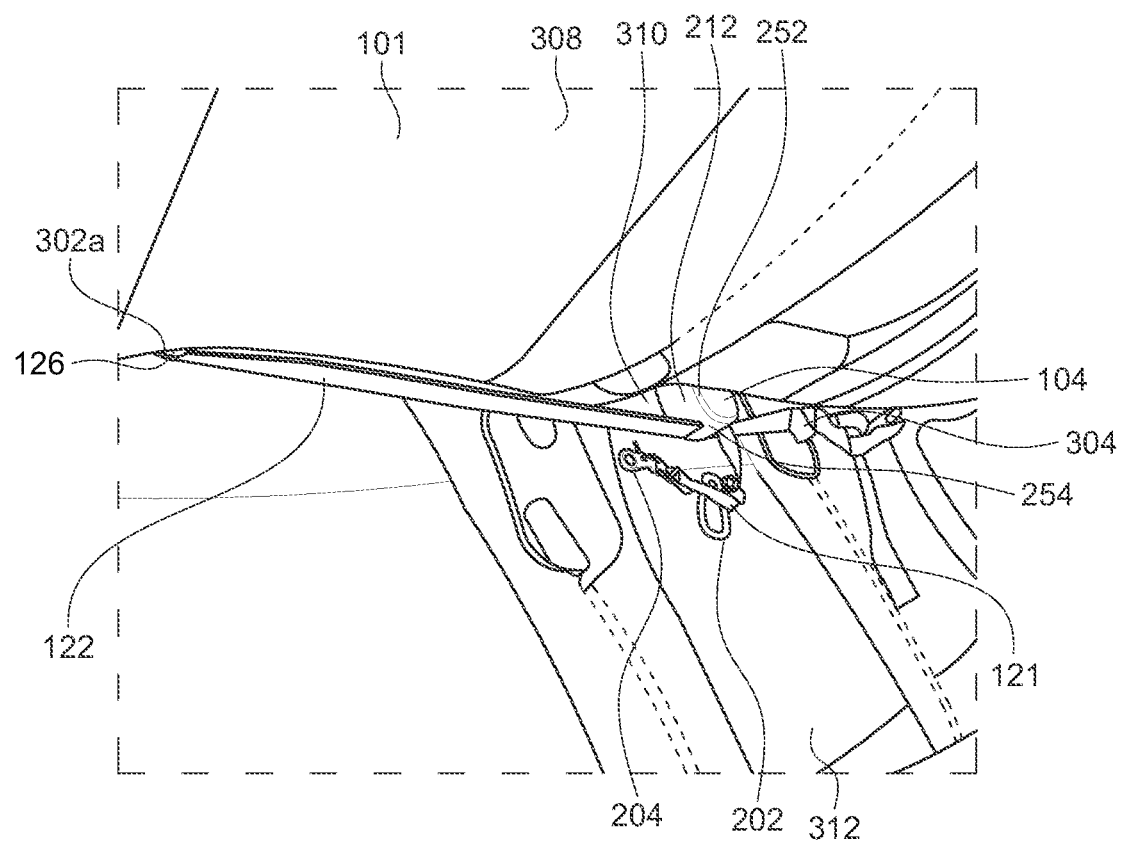
FIG. 3B depicts the ratchet strap shown in FIG. 3A used to attach the pet safety restraint device in a vehicle.
Figure 3C:
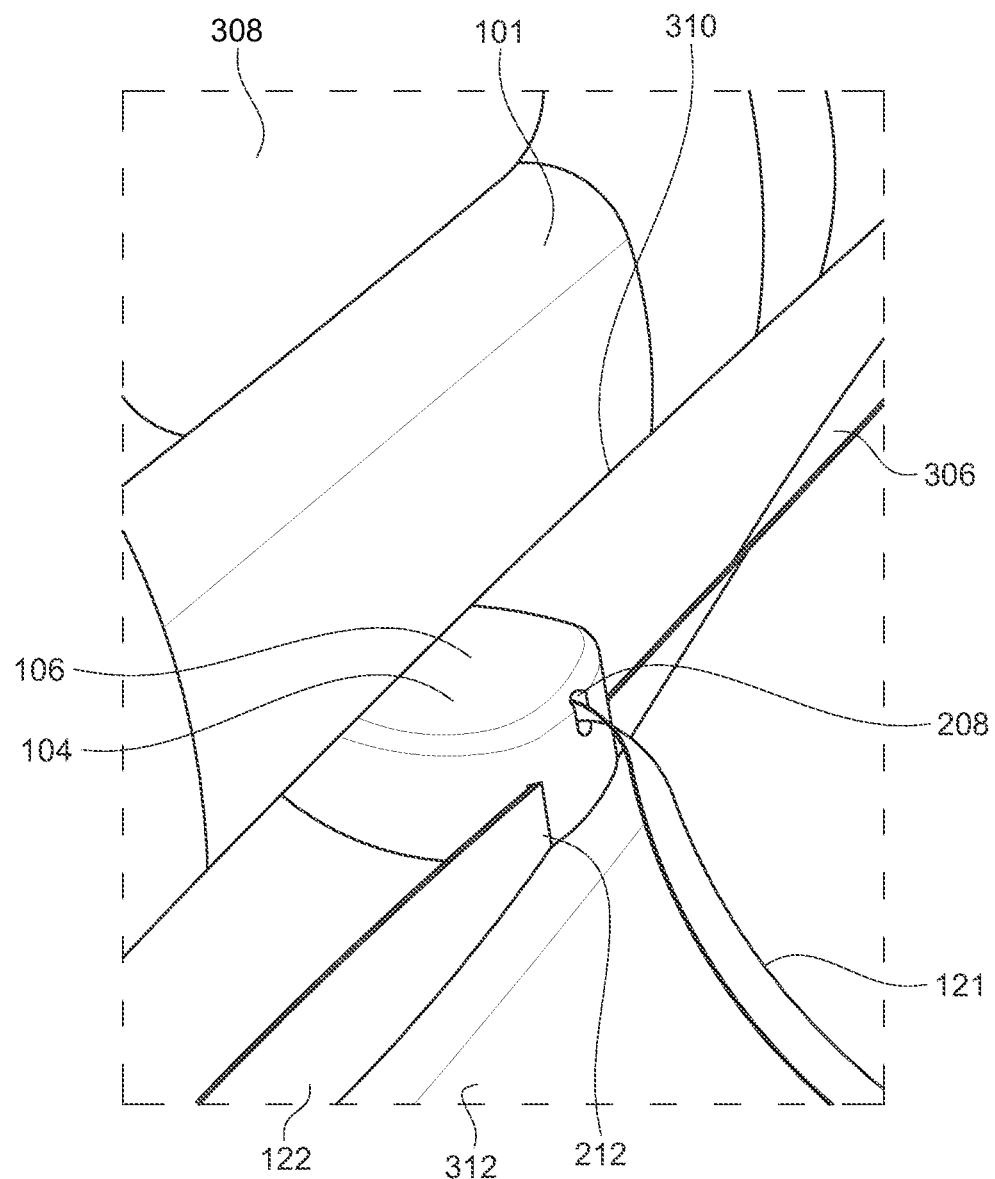
FIG. 3C depicts a close up view of the ratchet strap shown in FIG. 3A and used to attach the pet safety restraint device in a vehicle.
Figure 3D:
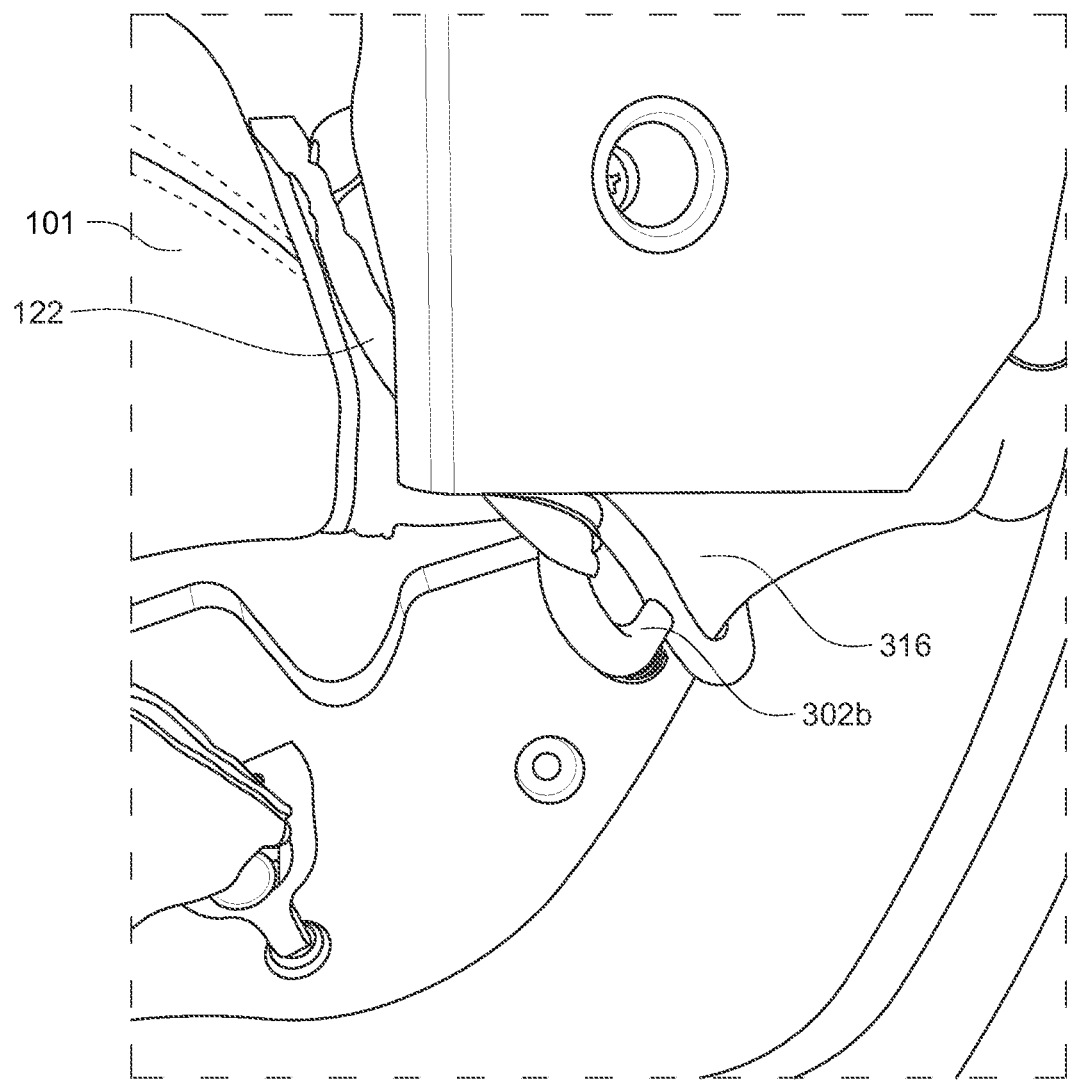
FIG. 3D depicts a close up view of an end portion of the ratchet strap shown in FIG. 3A attached to a side of a vehicle seat.

Turning to FIGS. 3A-3D, the ratchet strap 122 as shown in these FIG. 3A may include an elongated strap 306. In a non-limiting embodiment, the elongated strap 306 of the ratchet strap 122 may be made of webbing material, although any other material as known in the art may otherwise be utilized.

The elongated strap 306 may have a hook 302a, 302b on each end coupled to the ends of the elongated strap 306. Further, in a non-limiting embodiment, there may be a tightening buckle 304, as shown in FIG. 3A, that may be used similar to a seat belt, to loosen or tighten the ratchet strap 122 when positioned/attached to one or more parts of a vehicle 101.

FIG. 3B shows an example of the pet safety restraint device 104 securely and removably attached to the vehicle 101. In FIG. 3B, the assembled pet safety restraint device 104 is shown pushed into a central part of the backseat of a vehicle 101. The pet safety restraint device 104 is positioned, in this non-limiting embodiment, at the crease 310 between the back rest 308 and the back seat 312 of the vehicle 101. The ratchet strap 122 shown in FIG. 3A has been inserted into the ratchet strap slit 212 in the front 254 of the pet safety restraint device 104 as shown in FIG. 3B and FIG. 3C. FIG. 3C shows that the ratchet strap 212 is horizontally oriented along the backseat 308 of the vehicle 101 and inserted into the ratchet strap slit 212 while the retractable strap 121 extends through the notch 208 of the front side 254 of the pet safety restraint device 104. Accordingly, the retractable strap 121 does not interfere with the ratchet strap 122 or its placement in the anteriorly placed ratchet strap slit 212 when in use. FIG. 3B further shows at the end of the retractable strap 121 the one or more fasteners/clips 202, 204 that may be used to clip or otherwise fasten the fasteners/clips 202, 204 to a pet harness 124 on a pet 102.

In a non-limiting embodiment, a first hook 302a of the ratchet strap 122 may be hooked or otherwise attached to a child car seat anchor 126 as shown in FIG. 3B. FIG. 3D shows that the second hook 302b of the ratchet strap 122 may be hooked or otherwise attached to a side 316 of the back seat 312 of the vehicle 101 or another child car seat anchor 126. Using the belt tightener 304, as shown in FIG. 3A and FIG. 3B, the user can tighten the elongated strap 306 of the ratchet strap 122 in order to tighten the elongated strap 306 when the hooks 302a, 302b have been hooked in place (e.g., to the child car seat anchors 126 or other alternative anchor points 128 within the vehicle 101 such as the side 316 of the back seat 312 of the vehicle 101) in order to secure the pet safety restraint device 104 in place in between the back side 308 and back seat 312. It is noted that these placements of the hooks 302a, 302b may be altered in other arrangements as the user has the flexibility and ability to position the pet safety restraint device 104 in the best arrangement in his or her own vehicle 101.

Further, while FIG. 3B shows that the ratchet strap 122 is extended a long distance across the back seat 312 of the vehicle 101, in other instances, the user may not need as much space or distance to hook a first hook 302a and a second hook 302b of the ratchet strap 122 in place. As noted above, the inclusion of the belt tightener 304 may be used to make the elongated strap 306 of the ratchet strap 122 shorter if needed to cover a shorter distance.

It is noted that the pet safety restraint device 104 may be positioned and used on a front seat (ex. front passenger seat of a vehicle 101) to restrain and secure one's pet 102 rather than a back seat in one or more non-limiting embodiments. The pet restraint device 104 may be attached in the same way as described above with respect to the back seat of a vehicle 101. For example, the hooks 302a, 302b may be hooked onto the child safety anchors 126 or alternative anchor points 128 of a vehicle 101. Additionally, the elongated strap 306 may be wrapped around the back side of a front seat of a vehicle 101 and the hooks 302a, 302b attached to each other to also anchor and hold the pet safety restraint device 104 in place. The ratchet strap 122 may be tightened also using the tightening clip 304 as well (for either use in the back seat or the front seat of a vehicle 101).

Turning back to FIG. 2D, FIG. 2D shows an example of a base 110 of the pet safety restraint device 104 positioned in place on the bottom or underside 270 of the pet safety restraint device 104. The base 110 is removable in a non-limiting embodiment using a slide lock mechanism, such as slide lock mechanism. The base 110 may also be fastened to the cover 106 using one or more fasteners 210a, 210b, 210c, 210d distributed on each corner of the base 110 whereby the fasteners 210a, 210b, 210c, and 210d may be inserted into place within their respective fastener holes 418a, 418b, 418c, and 418d included on the base 110 with their corresponding fastener holes provided for in the cover 106 (e.g., cover fastener holes 1008a-1008b as shown in FIGS. 10A-10B). The sides of the base 110 may thus be positioned against the interior sides of the cover 106 when the base 110 is firmly attached in place into its respective position and joined (e.g., at joints 282a, 282b, 282c, and 282d) with the cover 106.

Figure 4:
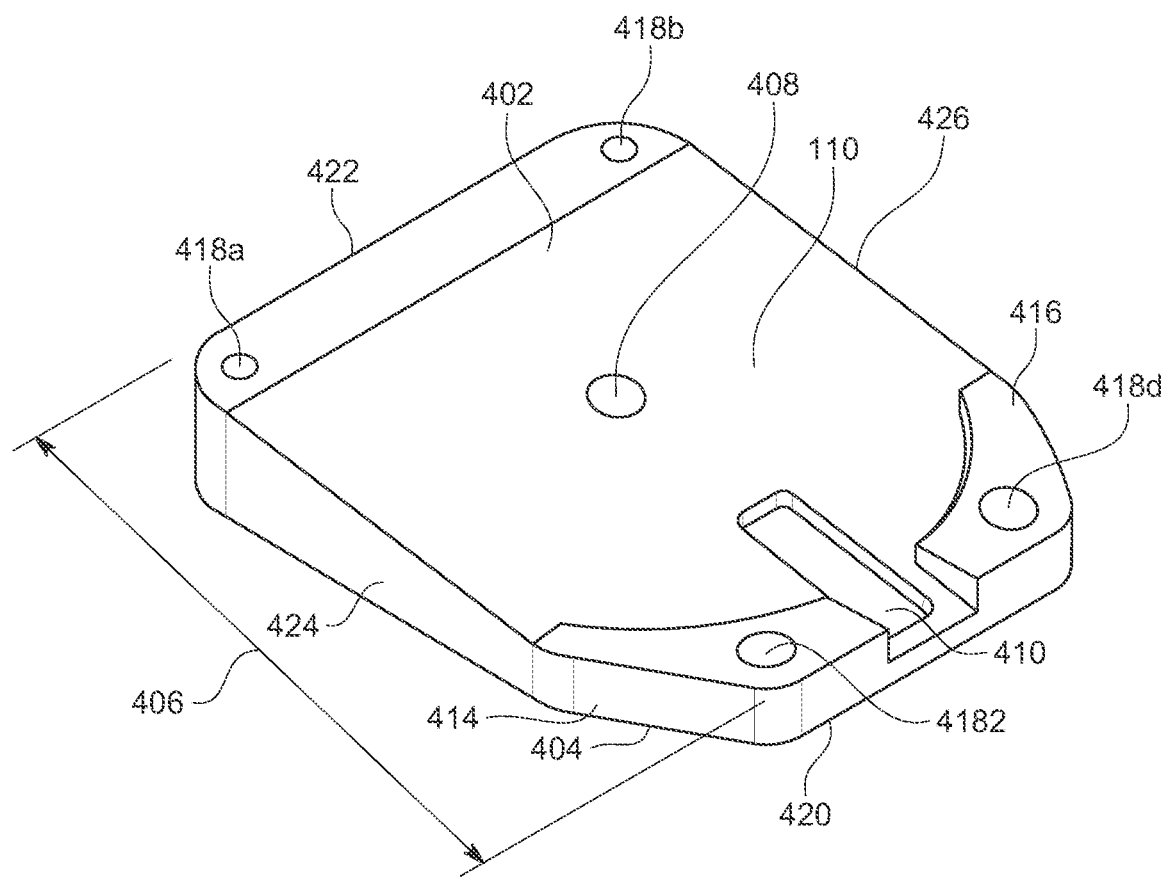
FIG. 4 depicts a top view of the base of the pet safety restraint device.
Figure 5:
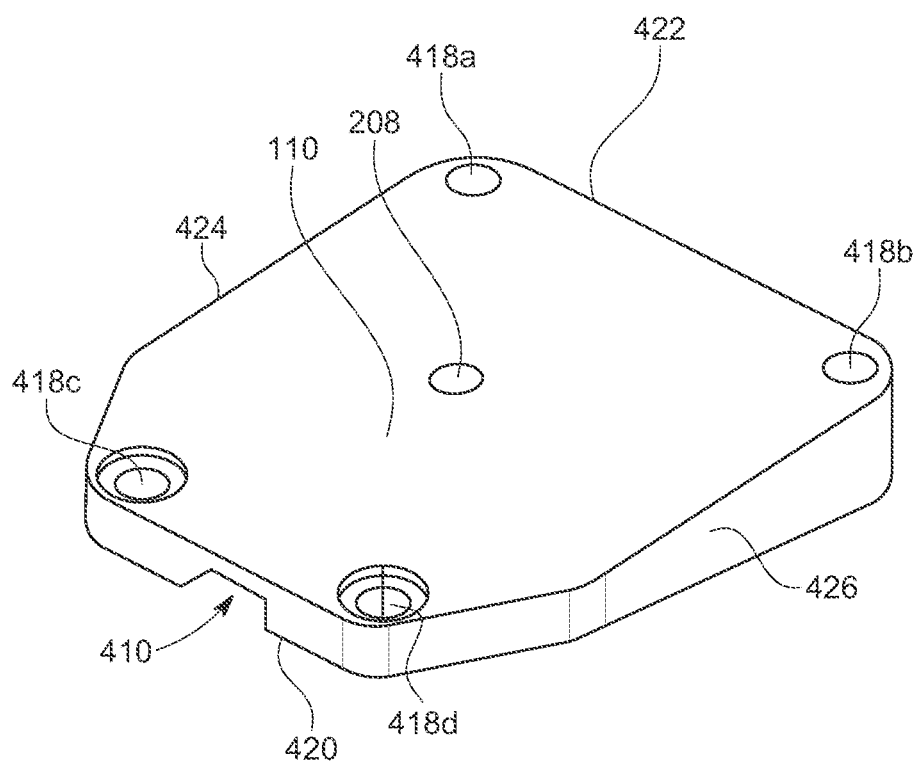
FIG. 5 depicts a bottom view of the base of the pet safety restraint device.

FIGS. 4-5 show further features of an exemplary base 110. FIG. 4 shows a top view of the base 110 with a view of the top surface 402 of the base 110, while FIG. 5 shows a bottom view of the base 110 and the bottom surface 404 of the base 110.

As shown in FIG. 4, the base 110 may be a separate, standalone unit. The base 110 may include a back side 420, front side 422, left side 424, and right side 426. The back side 420, as shown in FIG. 4, may be lower than the front side 422 and the upper surface 402 of the base 110 may slope 406 downwards from the front side 422 to the back side 420.

As shown in FIG. 2D, in a non-limiting embodiment, the back side 420 of the base 110 may coincide and be oriented to match the back side 252 of the cover 106, while the front side 422 of the base 110 may coincide with the front side 254 of the cover 106 when the base 110 is inserted into position under the cover 106 and further lodged in place in a vehicle 101 as shown in FIGS. 3B-3C.

Figure 11:
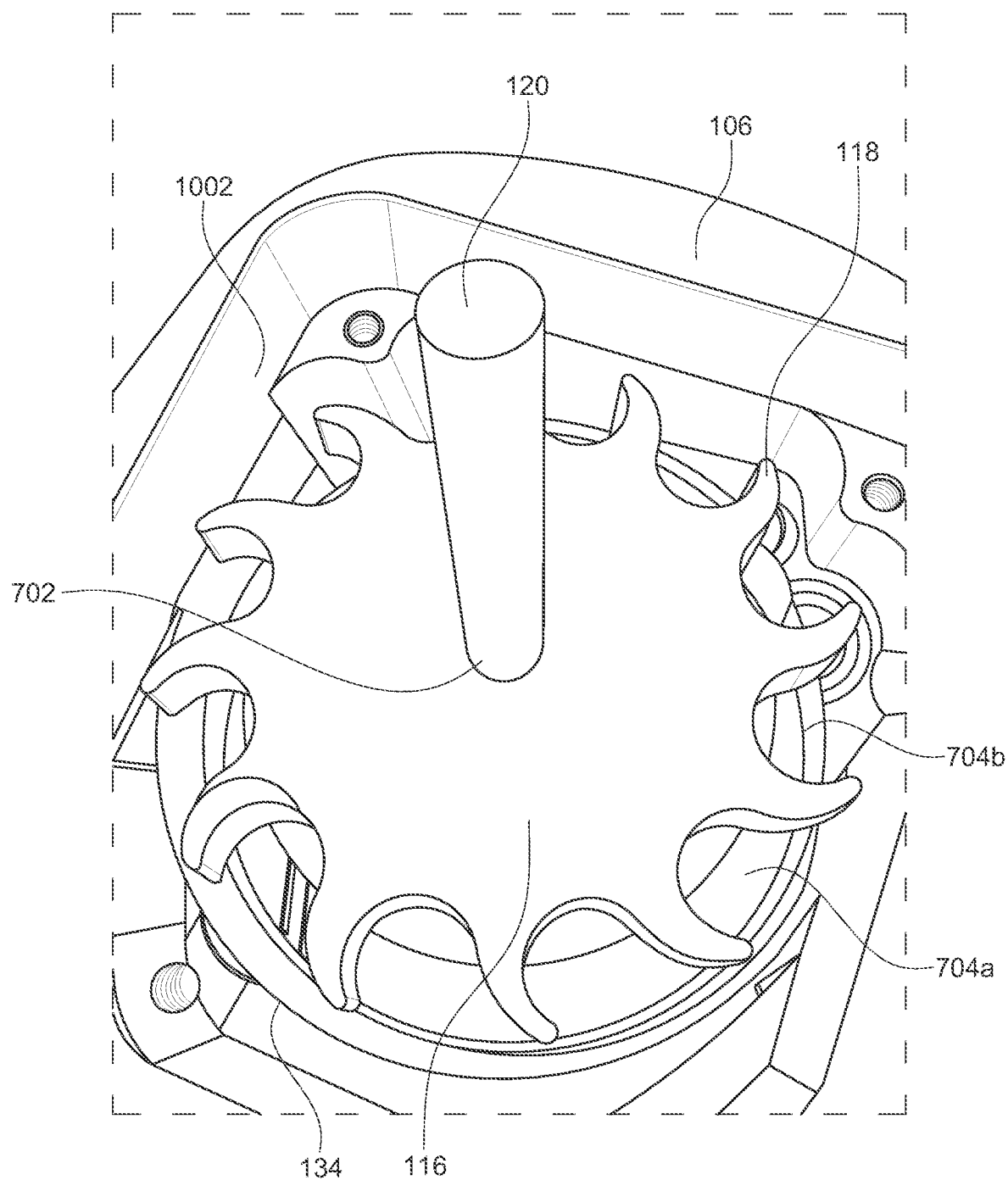
FIG. 11 depicts an exemplary pin extending through a gear coupled to a coil spring housing positioned within an interior cavity of the cover of the pet restraint device.

One or more fastener holes 418a, 418b, 418c, and 418d may be distributed and integrated into each corner of the base 110, as shown in FIG. 4. There may also be a base pin hole 408 as shown in FIGS. 4-5 that extends through a portion of the base 110. The pin 120, as shown in FIGS. 11-12 may extend through a portion of this base pin hole 110 in one or more non-limiting embodiments FIG. 4 further shows that included in the base 110 may be ball channel 410 on the top surface 402 of the base 110. The ball channel 410 may extend from a back side 420 of the base 110 and extend in an upward direction against the slope 406 of the base 110. The ball channel 410 of the base 110 does not extend all the way to the front side 422 of the base 110 but rather terminates at a point closer to the back 420 of the base 110. The ball channel 410 may be used to coordinate movement of a ball 114 (e.g., as shown in FIG. 13) when housed in the ball channel, 920 of the ball insert piece 108 as shown in FIGS. 9B-9C respectively and further discussed below.

In a non-limiting embodiment, the back side 420 of the base 110 may further include two raised ridges 414, 416 that are raised somewhat from the top surface 402 of the base 110 and positioned closer to the sides of the back 420 of the base 110. Fastener hole 418c may be integrated into a first side ridge 414 and fastener hole 418d may be integrated into the second side ridge 416 in a non-limiting embodiment.

Accordingly, looking to FIG. 2D, the fasteners 210a and 210b shown in FIG. 2D may be inserted through the base holes 418a and 418b of the base110, while the fasteners 210c and 210d, as shown in FIG. 2D, may be inserted into place through the holes 418c, 418d in the raised ridges 416, 418 of the base 110. As noted above, the back side 420 of the base 110 may coincide/be oriented towards the back side 252 of the cover 106, and the front side 422 of the base 110 may coincide with/be oriented towards the front side 254 of the cover 106 when the cover 106 and the base 110 are fastened or otherwise attached together to form the pet safety restraint device 104. This may be so that the ball channel 410 of the base 110 can function in accordance with the ball insert channel 920 shown in FIG. 9B and FIG. 9C and allow the ball 114 to lodge in place in between the spaces 704, as shown in FIG. 7, of the teeth 118 when an inertial force 130 forces the ball 114 to move within the pet safety restraint device 104. In a non-limiting embodiment, the ball channel 410 of the base 110 is narrow and beveled as is the ball channel 920 (e.g., as shown in FIGS. 9B-9C) of the ball insert piece 108. Further, the ball channel 410 of the base 110 is aligned in location and size (including width and length) with the ball channel 920 of the insert piece 108.

FIG. 6 and FIG. 7 show top and bottom views of the assembly of the coil spring housing 134 and the gear piece 116. The coil spring housing 134 is configured to house the coil spring 112, an example of which is shown in FIG. 12. As shown in FIG. 6, the interior cavity 606 of the coil spring housing 134 is shown. The interior cavity 606 of the coil spring housing 134 is defined or bordered by the interior sides of the coil spring housing 134 and the bottom interior surface 610 of the coil spring housing 134. The top surface 612 of the coil spring housing 134 is raised above the bottom interior surface 610 of the coil spring housing 134. The top surface 612 of the coil spring housing 134 includes a protruding lip or edge 620 as shown in FIG. 6. Further, there is a channel 602 cut into the coil spring housing 134 that leads to the interior cavity 606. Further, there may be a pin hole 604 integrated into and extending through a bottom surface 610 of the coil strap housing 134 that leads through to the pin hole 702 of the gear 116, which is shown in FIG. 7.

The coil spring housing 134 further serves to hold one end 1502 of the retractable strap 121, as shown in FIG. 15, in the retractable strap channel 602 of the coil spring housing 134.

In a non-limiting embodiment, as shown in FIG. 15, one end 1502 of the retractable strap 121 may be attached or inserted in place within a designated groove/notch 603 that may be cut into or otherwise created in one of the interior side surfaces of the coil spring housing 134. 1402 as shown in FIG. 14 shows the point where the retractable strap 121 enters into the entrance of the channel 602 of the coil spring housing 134 and connects to the groove/notch 603.

FIG. 15 is provided to show a close up view of the interior 606 of the coil spring housing 134 without the included coil spring 112. FIG. 15 shows a clearer view also of the groove/notch 603 in the side of the coil spring housing 134 that is dedicated to holding one end 1502 of the retractable strap 121.

As shown in FIG. 14, the retractable strap 121 can further wrap around the outer recessed surface 622 situated beneath the top lip 620 of the coil spring housing 134, as shown in FIG. 14. The outer surface 622 of the coil spring housing 134 may be recessed beneath the top lip 620 as shown in FIGS. 14-15 in one or more non-limiting embodiment. Accordingly, the retractable strap 121 may be held in place and allowed to extend and retract via the coil strap housing 134 and one or more of its components and structural pieces. Further, when fully assembled, the retractable strap 121 extends through the front surface 254 of the cover 106 and through the slit 208 shown in FIG. 2A, while also being connected internally within the pet safety restraint device 104 in the manner as described above.

FIG. 7 shows the connectable gear piece 116 with the teeth 118 of the gear piece 116 arranged generally around the perimeter of the gear piece 116. As shown in FIG. 7, there may be multiple spaces 704a, 704b, 704x between each tooth 118 of the gear piece 116. FIG. 13 shows a blueprint of the gear piece 116 and an exemplary ball 114 positioned in one of the spaces 704a of the gear piece 116. The ball 114 may be made of metal in one or more non-limiting embodiments, although any other type of material or combination of materials may alternatively be used, including, but not limited to plastic and a combination of plastic and/or metal. Further, the cover housing 106, base 110, and other components of the pet safety restraint device 104 may all be made of metal in one or more non-limiting embodiments, although other types of materials may alternatively be used, including but not limited to plastic. Further, in one or more non-limiting embodiments, the exemplary dimensions of the pet safety restraint device may be approximately 3 inches wide, 1.75 inches high, and 3.5 inches depth. It is noted that the pet safety restraint device 104 may be made larger or smaller than the listed dimensions as needed.

As shown in FIG. 8, the coil spring housing 134 is configured to be coupled to the gear piece 116, whereby the coil spring housing 134 is positioned above the gear piece 116, and further coupled to a top surface 402 of the base 110. In one or more non-limiting preferred embodiments, the coil spring housing 134 and the gear piece 116 may be integrally formed as a single, non-separable unit. In other embodiments, the gear piece 116 may be separately formed from the coil spring housing 134 and separately joinable via an element such as the pin 120. One or more pins 120, shown in an example in FIGS. 11-12, may be used to couple the coil spring housing 134 to the gear piece 116 and primarily as a structural component for the gear piece 116 to rotate upon. In other alternative embodiments, the pin 120 may not be needed when the coil spring housing 134 is attached to the gear piece 116 with alternative attachment means, such as via welding or soldering or other fasteners or if the coil spring housing 134 and gear piece 116 are formed as a single, connected unit when manufactured instead of as separate units.

When assembled and positioned onto the base 110, the coil spring channel 602 of the coil spring housing 134 may be positioned and oriented facing proximate to the ball channel insert 410 of the base 110, as shown in FIG. 8.

FIG. 9A shows that in addition to the above, there may be a ball insert 108 placed over the-back side 420 of the base 110 and over the ball channel insert 410 and in back of the assembled coil spring housing 134 and gear piece 116. FIG. 9A shows an exemplary top surface 902 of the ball insert 108, while FIG. 9B shows a bottom view of the bottom surface 904 of the exemplary ball insert 108. As shown in FIG. 9A, in a non-limiting embodiment, the back edge 950 of the ball insert 108 may not extend past the back edge 450 of the back side 420 of the base 110. Further the ball insert piece 108 may include angled sides towards the back area 908 of the ball channel 920 (e.g., as shown in FIG. 9C) of the ball insert piece 108, and one or more fastener holes 906*a*, 906*b* integrated into the body of the ball insert piece 108 towards the back 908 of the ball channel 920 of the ball insert 108. The front side 910 of the ball insert 108 may not be straight, as shown in a non-limiting embodiment in FIGS. 9A-9C, but rather may include a series of angled sides and curves to better fit within the interior of the cover 106 when positioned over the base 110 of the pet safety restraint device 104.

Notably, the ball insert 108 includes a ball insert channel 920 as shown in FIG. 9B and in FIG. 9C. FIG. 9C shows an exemplary view of just the base 110 and the ball insert piece 108 positioned in place over the back side 420 of the base 110. The ball insert 108 is configured such that the ball insert channel 920 extends along an underside surface 904 of the ball insert piece 108. When the ball insert piece 108 is in place, the ball insert channel 920 is positioned over the ball channel 410 of the base 110, which is shown in FIG. 9C. FIG. 9C shows a gap 980 between the underside of the surface 904 of the ball insert piece 108 and the top surface 402 of the base 110. Normally, in operation, there would be at least one ball 114 that is housed and stored in the ball channel 410 of the base 110 and that would be covered by the ball insert piece 108 and the embedded ball insert channel 920. In operation, when the pet safety restraint device 104 is securely attached in place in a vehicle 101 and coupled to a pet 102, the ball 114 is initially positioned within the ball channel 410 of the base 110 and bordered on the top surface of the ball 114 by the ball channel insert 920 of the ball insert piece 108 that is bottom facing and orienting the top surface of the ball 114. If an inertial force 130 is exerted on the pet safety restraint device 104, then the ball 114 is forced to roll/move along the ball channel 410 of the base 110 towards the spaces 704 of the teeth 118 of the rotating gear piece 116 and becomes lodged in the spaces 704 of the teeth 118 in order to initiate a locking action and prevent the retractable strap 121 from extending, and hold or restrain the attached pet 102 (e.g., via the attached pet harness 134). In a non-limiting embodiment, the ball channel 410 of the base 110 is narrow and beveled as is the ball channel 920 (e.g., as shown in FIGS. 9B-9C) of the ball insert piece 108. Further, the ball channel 410 of the base 110 is aligned in location and size (including width and length) with the ball channel 920 of the insert piece 108.

In another non-limiting embodiment, there may be another ball channel embedded in the base 110 on both sides (i.e., one on either side) of the base 110 and an additional insert that may be used to stop the pet 102 from any lateral forces that exert on the vehicle 102 and help with any side collisions. Accordingly, there may be a slot similar to slot 412 shown in FIG. 4 on either side of the base 110.

FIGS. 10A-10B show an exemplary cover 106 in more details which may also be located in FIGS. 2A-2D. As shown in FIG. 2A, the front 254 of the cover 106 includes the embedded slit 212 in a portion 214 of the front side 254 of the cover 106. Further, a notch 208 is carved or otherwise machined into a top area of the front side 254 of the cover 106 through which the retractable strap 121 may extend and connect to the coil spring housing 134. In a non-limiting embodiment, the retractable strap 121 is wound around the outside recessed surface 622, as shown in FIGS. 14-15, of the of the coil spring housing 134 and through the coil spring channel 602 to the groove/notch 603 that can extend and retract or unwind and wind back up via the movement and actions of the rotating gear 116. In a non-limiting embodiment, the cover 106 may appear as a rather rounded puck like device. In other embodiments, the appearance of the cover 106 and/or base 110 may be varied and may have straight edges or corners or appear to resemble other shapes, including, but not limited to a square, rectangle, triangle, cylinder, or any other shape known in the art.

FIGS. 10A and 10B show a more detailed, close-up view of the interior cavity 1002 of the cover 106. The cover 106 will cover the base 110 and the interior components, such as the gear 116, coil spring housing 134, coil spring 112, retractable strap 121, pin 120, ball insert piece 108, and ball 114, so the interior cavity 1002 is deep enough to cover such components in one or more non-limiting embodiment. Further, in one or more non-limiting embodiments, there may be a pin hole 1004 included in the interior top surface 1016 of the cover 106 to buttress the pin 120. Several fastener holes, such as fastener holes 1008*a-b* shown in FIGS. 10A-10B may be distributed around the corners of the interior of the cover 106. In a non-limiting embodiment, there may be four fastener holes 1008 to match the cover fasteners 210 shown in FIG. 2D. As shown in FIG. 2D, several fasteners (e.g., bolts and/or screws) may be used to fasten the base 110 to the cover 106 in the respective holes, including holes 1008*a-b*.

FIG. 11 shows an example of the gear piece 116 coupled to the coil spring housing 134 and a pin 120 extending through the gear pin hole 702 shown in FIG. 7 and through the coil spring-housing pin hole 604 shown in FIG. 6. FIG. 12 shows the flip side where the pin 120 is extended through the coil spring housing pin hole 604. It is noted that the pin 120 shown in FIG. 11 may not be to scale and that the pin 120 may not extend as far out or up in one or more non-limiting embodiments. Rather, the pin 120 may be shorter in length than as shown.

Further, FIG. 12 shows the coil spring 112 positioned within the coil spring housing 134 while the pin 120 extends through the coil spring housing pin hole 604. A retractable strap 121 would extend through the coil channel 602 (e.g., with an interior end 1502 of the retractable strap located in the groove 602 of the coil spring housing 134) and wind around the outer surface of the coil spring housing 134 in one or more non-limiting embodiments, which is one way in which the retractable strap 121 is configured to extend and retract while connected to the pet 102 via the pet harness 124 and the one or more clips 202, 204 (e.g., as shown in FIGS. 2A-2D) and the retractable strap 121.

FIG. 16 further shows that one end 1602 of the retractable strap 121 may be attached (e.g., via adhesive or other attachment means) to a point on the interior 1002 of the cover housing 106 while the other end of the retractable strap 121 is extended through the coil channel 602 and wound around or wrapped around the outer recessed surface 622 situated beneath the top lip 620 of the coil spring housing 134 as shown in FIG. 14. FIG. 16 shows an exemplary length of the retractable strap 121 attached to the interior 1002 of the cover housing 106 and also connected to the outer recessed surface 622 of the coil spring housing 134. Notably, the interior portion of the retractable strap 121 shown in FIG. 16 is connected to the outer visible portion of the retractable strap 121 as shown in FIG. 2A and FIG. 2B. The outer visible portion of the retractable strap 121 has an exterior end of the retractable strap 121 that is connected to the fastener 202 (e.g., carbineer clip) which can be hooked, clipped, or otherwise removably attached to a pet harness 124 worn by the protected pet 102.

Figure 17:
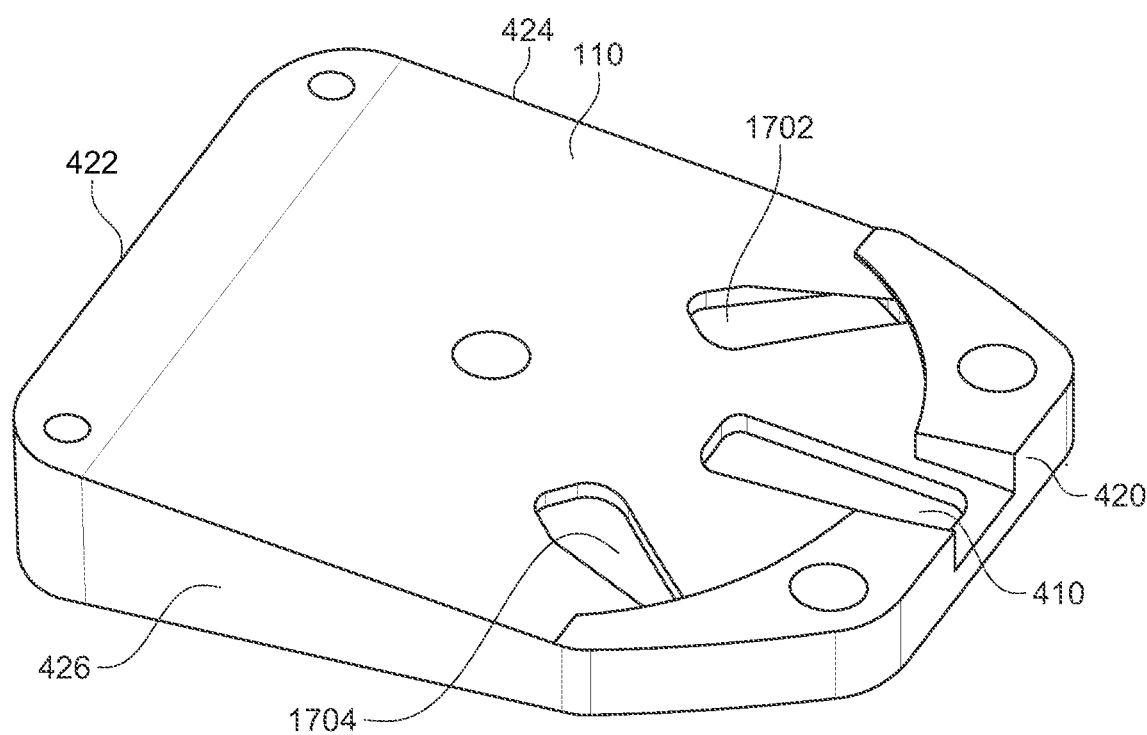
FIG. 17 depicts an illustration of another exemplary embodiment of a base for the pet safety restraint device having a center channel and also a left and a right side channel.

FIG. 17 depicts another example of a base 110 for the pet safety restraint device 104. In some cases, there may be an additional left side ball channel 1702 in the base 110 positioned to the left of the center ball channel 410 in the base 110, and also an additional right side ball channel 1704 positioned to the right of the center ball channel 410 in the base 110. The left side ball channel 1702 and the right side ball channel 1704 are adapted to receive a ball 114 in any of the channels 1702, 410, and 1704. This may be particularly advantageous for protecting a pet 102 from any side impact collisions that may occur in the vehicle 101, in which case it is more likely that the ball 114 would be forced into either the left side ball channel 1702 or the right side ball channel 1704.

It is noted that the ball slot channel 410 on the base 110 as shown in FIG. 17 and ball insert ball channel 920 shown in FIGS. 9B-9C may both be beveled in one or more non-limiting embodiments. By beveling the ball slot channel 410 on the baes 110 and the ball insert ball channel 920 on the ball insert piece 108, it may be advantageous because beveling these slots or channels 410, 920 respectively keeps or prevents the steel ball 114 from wearing away the edges and material of the channels 410, 920. If the edge becomes worn down on these channels 410, 920, then the ball 114 does not fit as securely within the channels 410, 920 and is held more loosely in place which degrades the performance of the pet safety restraint device 100.

Figure 18:
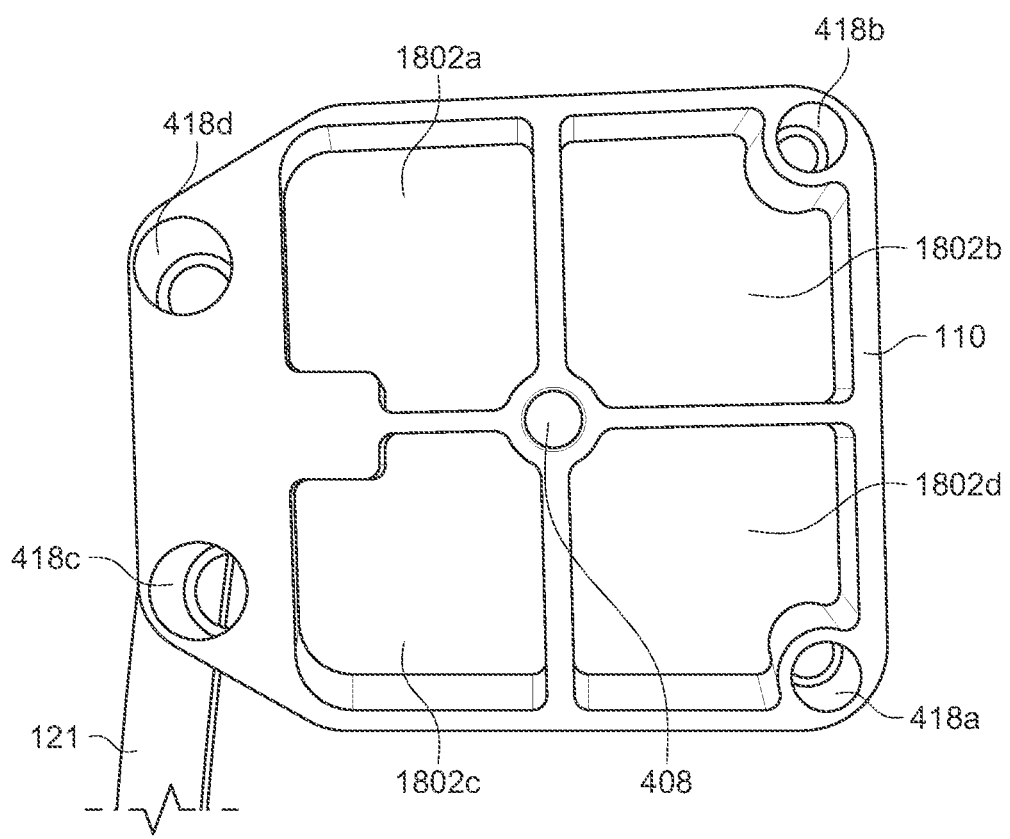
FIG. 18 depicts another exemplary embodiment of a base of the pet safety restraint device having integrated pockets.

FIG. 18 depicts another exemplary embodiment for a base 110 of the pet safety restraint device 100. In this exemplary embodiment, there are a set of pockets 1802a, 1802b, 1802c,1802d embedded into an underside of the base 110 of the pet safety restraint device. Such pocket 1802a, 1802b, 1802c, and 1802d may help with weight reduction for the base 110 and the pet safety restraint device 100. The pockets 1802a, 1802b, 1802c, and 1802d may be arranged as shown in FIG. 18 as squares or rectangles arranged around the base pin hole 408 drilled through the body of the base 110. The fastener holes 418a, 418b, 418c, and 418d may be distributed as shown in FIG. 18 around the corners of the base 110 and without interfering with the pockets 1802a, 1802b, 1802c, and 1802d of the base 110. The fasteners 210a, 210b, 210c, and 210d may still be inserted into fastener holes 418a, 418b, 418c, and 418d as shown in FIG. 2D and explained above with respect to FIG. 2D.

Figure 19:
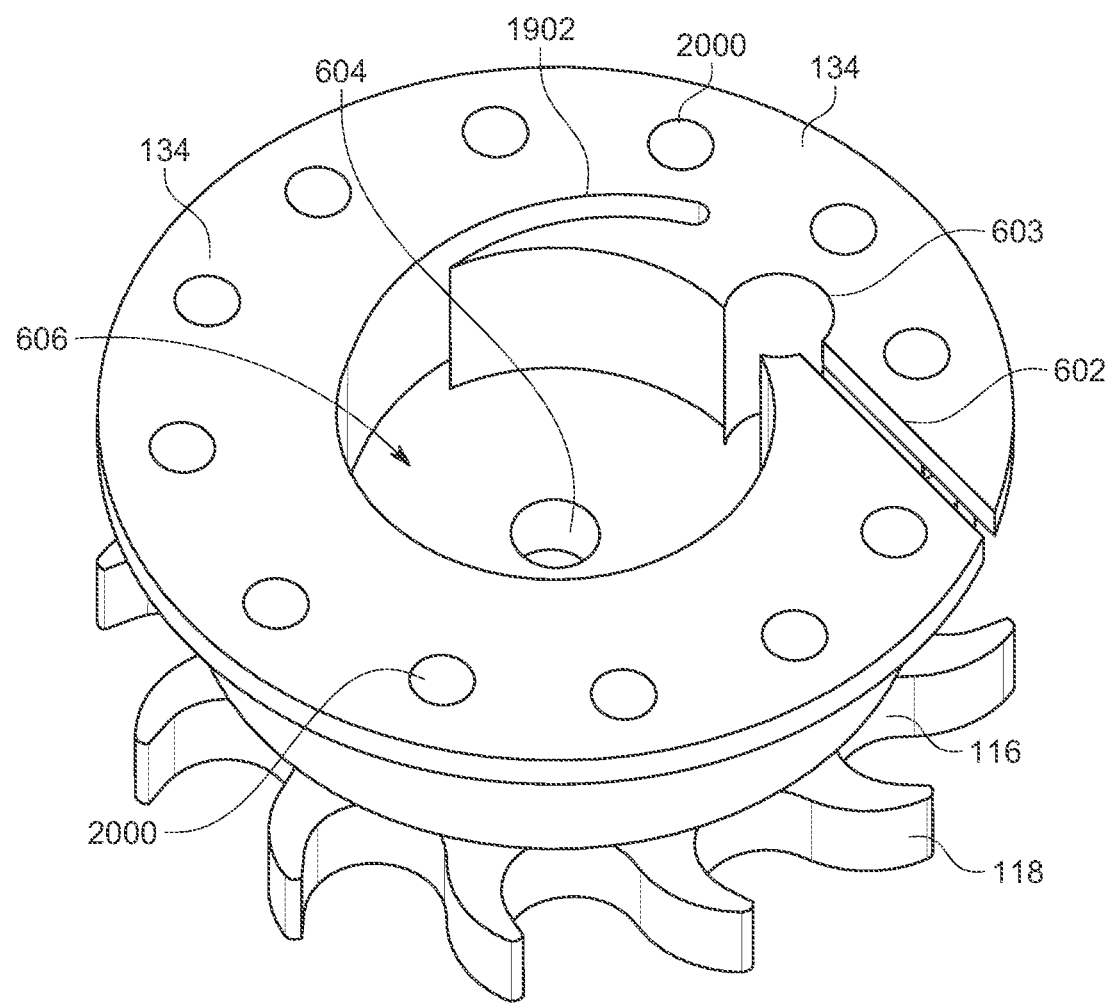
FIG. 19 depicts another exemplary embodiment of the coil spring housing attached to the gear cap.
Figure 20:
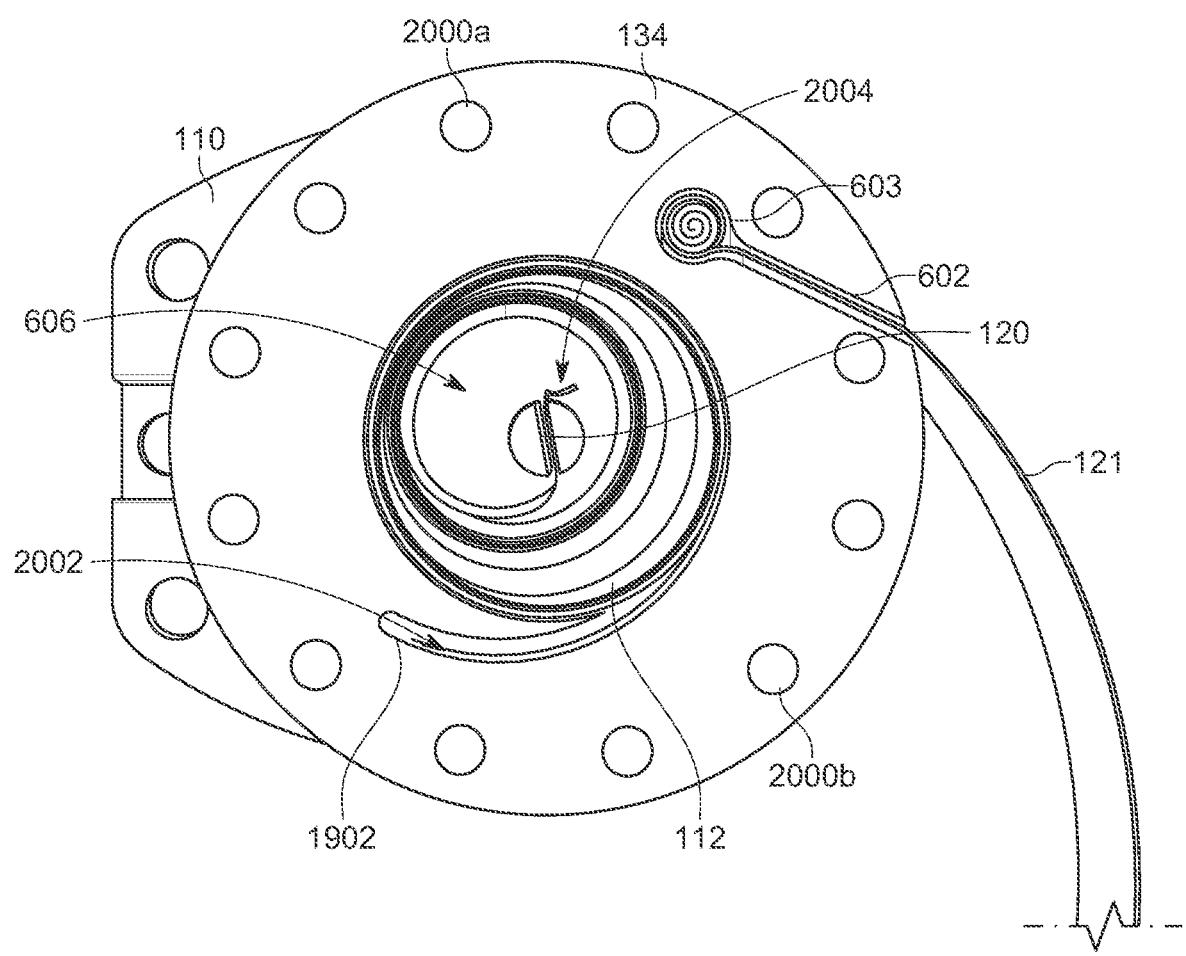
FIG. 20 depicts another exemplary embodiment of the coil spring housing having a coil in the coil spring housing and the gear attached to the underside of the coil spring housing.

FIG. 19 and FIG. 20 depicts another exemplary embodiment of the assembly of the coil spring housing 134 combined with the gear 116. In a non-limiting embodiment, the coil spring housing 134 may include one or more holes or openings 2000 drilled into an outward facing surface of the coil spring housing 134 which may make the coil spring housing 134 and gear 116 lighter weight. As shown in FIGS. 19-20, there are twelve different holes or openings 2000 included on the coil spring housing 134, however, in other non-limiting embodiments there may be more or less holes or openings 2000 other than the openings 2000 shown in FIGS. 19-20.

As shown in FIG. 20, the retractable strap 121 is configured to extend from the terminal end 603 of the channel 602. The retractable strap 121 is shown coiled into the terminal end 603 of the channel 602 in FIG. 20. FIG. 19 shows a view of the coil spring housing 134 without the coil spring 112 contained therein. The retractable strap 121 can function in accordance with the description of retractable strap 121 as described with respect to FIGS. 1-18 above. As noted above, in a non-limiting embodiment, and as also shown in FIG. 15, one end 1502 of the retractable strap 121 may be attached or inserted in place within a designated groove/notch 603 that may be cut into or otherwise created in one of the interior side surfaces of the coil spring housing 134. 1402 as shown in FIG. 14 shows the point where the retractable strap 121 enters into the entrance of the channel 602 of the coil spring housing 134 and connects to the groove/notch 603.

FIG. 20 shows the coil spring cavity 606 with a coil spring 112 contained therein and a first end 2002 of the coil spring 112 held in place by a channel or slot 1902 for the coil spring 112. FIG. 20 further shows the opposite end 2004 of the coil spring 112 bent around the corner edge of the pin 120 in order to help keep the end 2002 of the coil spring 112 in place within the coil spring cavity 606. The coil spring slot 1902 may be useful for keeping the first end 2002 of the coil spring 112 in place to prevent any slippage out of the interior cavity 606 of the coil spring housing 134 offering improved performance for the pet safety restraint device 100. The combination of the coil spring slot 1902 and the bending of the end 2004 of the coil spring 112 around the inserted pin 120 (which is inserted through the pin hole 602 in the interior cavity 606 in the coil spring housing 606 and through to the underside in the pin hole 702 on the gear 116) helps to keep the coil spring 112 securely in place.

Figure 21:
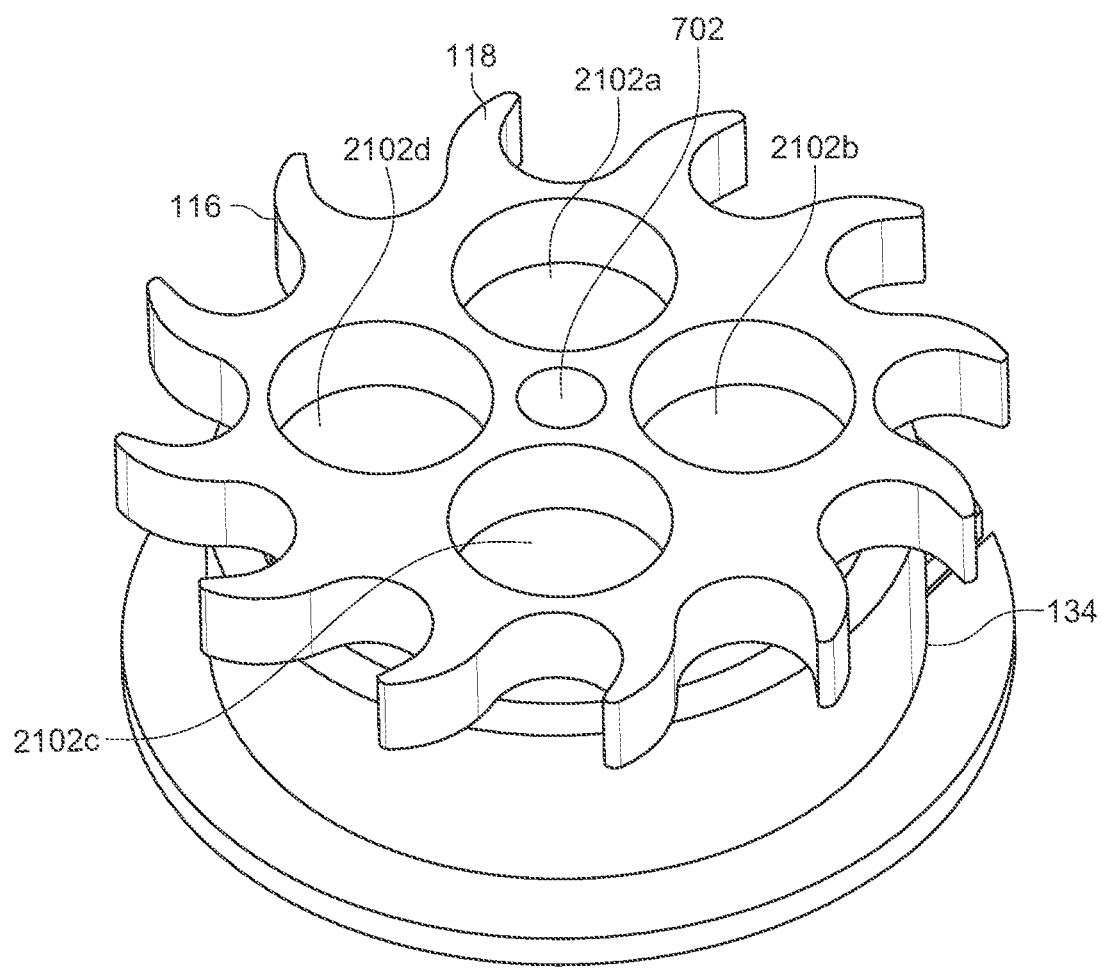
FIG. 21 depicts an underside of the coil spring housing with a view of the gear having one or more openings.

FIG. 21 depicts an illustration of the underside of the coil spring housing 134, namely the gear cap 116 having one or more teeth 118. In this exemplary embodiment shown in FIG. 21, there are additional holes or openings 2102a, 2102b, 2102c, and 2102d machined into the body of the gear 116. These additional gear holes or openings 2102a, 2102b, 2102c, and 2102d may allow for a lighter gear 116 that has less overall spring resistance for overall better performance and weight reduction.

Advantageously, the one or more embodiments of the pet safety restraint device 104 as described herein may provide for a safe and effective means for protecting one's pet 102 when the pet 102 is in the vehicle 101, including but not limited to, automobiles. Advantageously, the pet safety restraint device 104 is portable and compact in its profile, as shown in the one or more non-limiting embodiments, but is able to be easily secured and attached to the vehicle 101 when needed and stored when not needed. Further, having a pet safety restraint device 102 may encourage the pet 102 to sit more in the vehicle 101 rather than moving around due to the restraint device 102.

Further, all of the interior components of the pet safety restraint device 104 may be preassembled and positioned within the pet safety restraint device 104 and operate via inertia and other scientific principles to prevent the pet 102 from unfettered movement especially during a crash or accident. Advantageously, the pet safety restraint device 104 does not require batteries or other means of power to operate. Many advantages and benefits are offered by the one or more non-limiting embodiments of the pet safety restraint device 104 as described herein.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, and steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted. The term "coupled to" as used herein may refer to a direct or indirect connection. The term "set" as used herein may refer to one or more item.

Specific details are given in the description to provide a thorough understanding of the embodiments. However, embodiments may be practiced without these specific details. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figure.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A pet safety restraint device comprising:
   a cover housing having an interior cavity;
   a rotatable gear piece having one or more teeth with spaces between each tooth;
   a coil spring housing coupled to a topside of the rotatable gear piece, wherein the coil spring housing comprises a coil spring cavity and a coil spring slot extending into the coil spring housing from the coil spring cavity for attaching a coil spring,
   wherein the coil spring housing and the rotatable gear piece are either a single, integrally formed unit or are attached together as separate pieces;
   the coil spring configured to be positioned inside of the coil spring cavity;
   at least one ball, wherein the at least one ball is configured to fit within a space of the spaces between each tooth of the rotatable gear piece when an inertial force is exerted on the pet safety restraint device;
   wherein the rotatable gear piece, the coil spring housing, and the coil spring are contained within the interior cavity of the cover housing; and
   a base, wherein the base is configured to connect to an underside of the cover housing,
   wherein the pet safety restraint device is configured to couple to a pet harness to restrain a pet in a vehicle.

2. The pet safety restraint device of claim 1, wherein the rotatable gear piece further comprises one or more gear piece openings that extend into the body of the rotatable gear piece.

3. The pet safety restraint device of claim 1, wherein the coil spring housing comprises one or more coil spring openings extending in an arrangement around a surface of the coil spring housing, wherein the surface defines the coil spring cavity.

4. The pet safety restraint device of claim 1, wherein one or more pockets are machined into an underside of the base.

5. The pet safety restraint device of claim 1, further comprising, a ball insert piece having a ball channel is not positioned in the spaces between each tooth, wherein the ball insert piece is contained within the interior cavity of the cover housing.

6. The pet safety restraint device of claim 1, further comprising, a retractable leash.

7. The pet safety restraint device of claim 6, further comprising, the retractable leash coupled to the coil spring housing.

8. The pet safety restraint device of claim 7, wherein one end of the retractable leash is wound around an outside surface of the coil spring housing and coupled to the underside of the cover housing.

9. The pet safety restraint device of claim 8, wherein the retractable leash is configured to extend and retract while wound around an outside surface of the coil spring housing.

10. The pet safety restraint device of claim 9, wherein the retractable leash further comprises a fastener at an exteriorly visible end, wherein the fastener is configured to fasten to the pet harness holding the pet.

11. The pet safety restraint device of claim 1, further comprising a ratchet strap configured to fit within a slit integrated into the cover housing.

12. The pet safety restraint device of claim 11, wherein the slit is machine cut into a front side of the cover housing.

13. The pet safety restraint device of claim 1, wherein the coil spring housing and the rotatable gear piece comprise a pin hole, wherein the pin hole extends generally centrally through the coil spring housing and through the rotatable gear piece.

14. The pet safety restraint device of claim 13, wherein a pin fits within the pin hole.

15. The pet safety restraint device of claim 1, wherein the base further comprises a ball channel in the base, wherein the ball channel in the base aligns with the ball channel in the ball insert piece.

16. The pet safety restraint device of claim 15, wherein the ball channel in the base is beveled and the ball channel in the ball insert piece is also beveled.

17. The pet safety restraint device of claim 16, wherein a top surface of the base is angled with the ball channel in the base located near a lower end of the top surface of the base.

18. The pet safety restraint device of claim 1, wherein the base comprises fastener holes located on one or more edges of the base.

19. The pet safety restraint device of claim 18, wherein the fastener holes are configured to receive fasteners to fasten the base to the underside of the cover housing.

20. The pet safety restraint device of claim 1, wherein the coil spring housing and the rotatable gear piece are coupled to a top surface of the base.

* * * * *